(12) United States Patent
Koide et al.

(10) Patent No.: US 6,515,446 B1
(45) Date of Patent: Feb. 4, 2003

(54) MOTOR CONTROL APPARATUS AND CONTROL METHOD

(75) Inventors: Satoshi Koide, Okazaki (JP); Yasutomo Kawabata, Aichi-ken (JP); Eiji Yamada, Owariasahi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/958,149

(22) PCT Filed: Apr. 17, 2000

(86) PCT No.: PCT/JP00/02509

§ 371 (c)(1),
(2), (4) Date: Oct. 5, 2001

(87) PCT Pub. No.: WO00/64039

PCT Pub. Date: Oct. 26, 2000

(30) Foreign Application Priority Data

Apr. 19, 1999 (JP) ............................................. 11-111040

(51) Int. Cl.⁷ ................................................. H02P 1/46
(52) U.S. Cl. ........................................ 318/700; 318/720
(58) Field of Search .................... 318/700, 720–724, 318/504

(56) References Cited

U.S. PATENT DOCUMENTS 5,438,502 A * 8/1995 Rozman et al. ............... 363/35
5,594,307 A   1/1997 Adachi et al.
5,952,810 A * 9/1999 Yamada et al. ............. 318/700
6,112,156 A * 8/2000 Kang ........................... 702/58

FOREIGN PATENT DOCUMENTS

| DE | 195 04 435 A1 | 8/1995 |
| JP | 5-236784 A | 9/1993 |
| JP | 6-197549 A | 7/1994 |
| JP | 7-177788 A | 7/1995 |
| JP | 7-227097 A | 8/1995 |
| JP | 7-327381 A | 12/1995 |
| JP | 8-172798 A | 7/1996 |

* cited by examiner

*Primary Examiner*—Marlon T. Fletcher
(74) *Attorney, Agent, or Firm*—Oliff & Berridge, PLC

(57) ABSTRACT

The technique of the present invention sets a torque voltage to be applied to a motor in response to a required torque and adjusts the duty of an inverter to ensure application of the torque voltage according to the observed voltage of a battery. In a motor controller constructed to attain such control, before a start-up of normal operation of the motor, a fixed duty is set for switching the inverter to apply a voltage to the motor. The value of electric current running in response to the applied voltage is measured. The mapping of the value of electric current to the source voltage in the case of switching the inverter at a fixed duty is stored in advance in the form of a table. The procedure reads the true value of the source voltage from the table and thereby specifies an offset error occurring in a voltage sensor of the battery. The procedure then corrects the observed voltage of the battery and adequately regulates the torque voltage.

14 Claims, 17 Drawing Sheets

MOTOR CONTROL APPARATUS AND CONTROL METHOD

TECHNICAL FIELD

The present invention relates to a motor controller that adequately regulates a voltage applied from a power source to a coil of a motor, thereby controlling operation of the motor, and also to a corresponding motor controlling method.

BACKGROUND ART

Various motors are used for industrial machinery and railcars. Recently proposed hybrid vehicles also use a motor as part of the power source. The motor is rotated by interaction of magnetic fields generated by a stator and a rotor. At least one of the magnetic fields is generated by power supply to a motor coil. In the case of a permanent magnet-type synchronous motor, permanent magnets are attached to a rotor, whereas a coil is wound on a stator. Supply of a multi-phase alternating current through the coil of the stator produces a revolving magnetic field on the stator. In the synchronous motor, the rotor is rotated synchronously with the revolving magnetic field thus generated.

The motor operation is controlled by regulating the voltage applied to the coil and thereby regulating the electric current running through the coil. For example, in order to output a large torque, the control increases the voltage applied to the coil to enhance the electric current and generate a strong magnetic field. In order to output a small torque, on the other hand, the control decreases the voltage applied to the coil to reduce the electric current and generate a weak magnetic field.

An inverter is often used to regulate the voltage applied to the coil. The inverter is a circuit of converting a DC voltage into an AC voltage and has pairs of switching elements, where the switching elements in each pair respectively connect with the source and the sink of a power source of a fixed voltage. The voltage applied to the coil is varied by changing a duty, that is, the on rate of the switching elements per unit time. Raising the duty on the source side increases the output voltage. Lowering the duty, on the other hand, decreases the output voltage. In order to regulate the voltage applied to the coil to a desired value, it is required to drive the inverter at an appropriate duty according to the source voltage.

The prior art technique sets a target voltage to be applied to the motor coil in response to a required torque and specifies the duty based on a source voltage measured with a sensor, in order to attain the setting. The motor operation is then controlled through the on-off operation of the switching elements included in the inverter at the specified duty.

The prior art control method may not, however, sufficiently control the motor operation. The sensor used for measuring the source voltage may cause an error for example, due to the factors of the environment, in which the motor is used. The error arises as an offset error where the observed value is deviated from a true value in either the positive direction or in the negative direction. The quantity of the offset is varied by the environmental and other factors.

The prior art technique controls the motor operation without considering the potential effects of the offset error. As mentioned above, the voltage applied to the motor coil is regulated by adjusting the duty of the inverter on the basis of the source voltage. An error included in the source voltage interferes with application of a desired voltage to the coil. The prior art control technique thus does not ensure accurate output of the required torque.

The detection error of the source voltage further causes the following troubles in the control of the synchronous motor. As discussed previously, the synchronous motor is driven by the revolving magnetic field, which rotates at a speed synchronous with the revolving speed of the rotor. In order to generate such a magnetic field, power supply to the coil is required according to the electrical rotational angle of the rotor, that is, the electrical angle. A sensor like a Hall element is generally used for detection of the electrical angle. The technique of sensor-less detection of the electrical angle has also been proposed to simplify the structure of the motor controller and thereby enhance the reliability.

The process of sensor-less detection of the electrical angle tentatively estimates the electrical angle to a certain value and applies a preset electrical angle detection voltage to the motor coil. The process then measures the electric current running through the coil in response to the applied electrical angle detection voltage. The relationship between the voltage and the current is expressed by a voltage equation. When no error is included in the estimated electrical angle, this equation is equal to zero. When the estimated electrical angle includes some error, the result of the voltage equation is deviated from zero according to the quantity of the error. An error or a difference between the estimated electrical angle and a true value may be specified, based on the deviation of the result of the voltage equation.

Application of the electrical angle detection voltage with a high accuracy is required for accurate sensor-less detection of the electrical angle. The value of the electrical angle detection voltage is also regulated by adjusting the duty according to the source voltage. The prior art technique does not take into account the value of source voltage in the process of application of the electrical angle detection voltage. The value of the electrical angle detection voltage is thus varied, due to the detection error of the source voltage. This may lower the accuracy of detection of the electrical angle. The lowered accuracy of detection of the electrical angle may cause troubles, such as pulsation of the torque, and damage the smooth operation of the motor.

A variety of apparatuses with a motor have been proposed recently, and there has been a high demand to enhance the accuracy of the motor operation control. Under such circumstances, the decrease in accuracy due to the error of the source voltage is thus not negligible. In some apparatuses using the motor as the power source, the power source may have an extremely high voltage. In such apparatuses, the effect of the error included in the source voltage is especially significant.

DISCLOSURE OF THE INVENTION

The object of the present invention is thus to provide a technique that relieves the drawbacks due to a detection error of a voltage applied to a motor coil and thereby adequately controls motor operation. In order to attain this and the other related objects, the present invention is arranged as discussed below.

The present invention is directed to a motor controller that regulates a voltage applied from a power source to a coil of a motor and thereby controls operation of the motor. The motor controller includes: a voltage estimation unit that estimates a voltage of the power source; a detection voltage application unit that applies a preset detection voltage to the coil, based on the estimated voltage; an electric current detection unit that measures a value of electric current running through the coil in response to the applied detection voltage; an error specification unit that specifies an error included in the estimated voltage, based on the estimated voltage and the observed value of electric current; and an operation control unit that reflects the specified error on control of the operation of the motor.

The motor controller of the above arrangement reflects the error included in the source voltage on the control. For example, when the absolute value of the error is greater than a preset value, the technique of the invention determines the occurrence of some abnormality and carries out a separately provided control process. The separately provided control process may be an additional process that is carried out in addition to a general control procedure or a substitutive process that is carried out in place of the general control procedure. The additional process that is carried out in addition to the general control procedure is, for example, a process of calibrating the source voltage or a process of informing a driver of the occurrence of some abnormality. The substitutive process that is carried out in place of the general control procedure is, for example, an abnormal-time control process to restrict the output torque within a predetermined range.

In accordance with one application of the error-reflected motor operation control, the operation control unit has a voltage application control unit that applies a predetermined voltage according to a working state of the motor to the coil by taking into account the specified error.

The motor controller of this embodiment ensures application of an appropriate voltage according to the working state of the motor by taking into account the error included in the estimated source voltage. This arrangement thus desirably enhances the accuracy of the operation control of the motor.

As discussed previously, the voltage applied to the motor coil is generally controlled by regulating a driving circuit, such as an inverter, according to the source voltage. The prior art technique carries out control on the assumption that the source voltage measured with a sensor is a true value. The motor controller of the present invention, on the other hand, tentatively estimates the source voltage to a certain value. The detection voltage application unit applies the detection voltage, based on the estimated voltage. When there is an error or a difference between the estimated voltage and the true value, the applied detection voltage is deviated from a preset value. The error of the applied detection voltage is detected as the difference between the electric current actually running through the coil in response to the applied voltage and the electric current to be run through the coil when the estimated voltage is the true value. The error of the estimated source voltage is thus specified, based on the detected error. The motor controller of the present invention enables an appropriate voltage to be applied to the coil by taking into account the specified error.

In the motor controller of the present invention, the voltage estimation unit may have any of diverse arrangements. One example assumes that the source voltage is a fixed value. This simplifies the general structure of the motor controller and the whole series of processing.

The voltage estimation unit may carry out the estimation, based on a measurement result of a voltage of the power source. This arrangement restricts the error or difference between the estimated voltage and the true value within a relatively small range, thus ensuring adequate reflection of the error.

The application of the detection voltage may be implemented by regulating the driving circuit, such as the inverter, to apply a fixed voltage or by keeping the control state of the driving circuit constant. In the former case, the control state of the driving circuit changes according to the estimated source voltage. This leads to a variation in voltage applied to the coil. In the latter case, the actual variation of the source voltage directly appears as a variation of the voltage applied to the coil. In either case, when the estimated voltage includes an error, a voltage deviated from the required detection voltage is applied to the coil. The latter case corresponds to the state in which the estimated source voltage is fixed to a certain value.

In the motor controller of the present invention, the error specification unit may also have any of diverse arrangements.

In one preferable embodiment, the error specification unit has: a storage unit that stores a mapping of the voltage to the value of electric current; and an error computation unit that refers to the mapping to specify the error.

This arrangement refers to the storage unit and specifies the value of electric current to be detected on the assumption that the estimated source voltage is the true value. The actual source voltage is, on the other hand, calculated from the observed electric current. These calculations quantitatively determine an error between the estimated value and the true value. The storage unit may store the voltage-current relationship in the form of a function or in the form of a table. The function advantageously reduces the required storage capacity, whereas the table adequately represents the voltage-current relationship even having a significant degree of non-linearity, which is not expressible by the function.

The error specification unit is not restricted to the structure of quantitatively determining the error, but may be constructed to determine occurrence or non-occurrence of an error. One example of such construction stores the value of electric current to be detected in response to a preset detection voltage and compares the stored value of electric current with the observed value of electric current. When the occurrence or non-occurrence of an error is determined, the motor control with reflection of the error may be attained by successively changing the estimated source voltage and repeatedly applying the detection voltage.

The motor controller of the present invention is not restricted to the AC motor or the DC motor but is applicable to a diversity of motors that control the operation by regulating the voltage applied to the coil based on the source voltage. The motor controller may be constructed as discussed below in the case of application to a specific motor.

In one embodiment, when the motor controller of the present invention is applied to a motor rotating with a multi-phase alternating current, the motor controller has an electrical angle detection unit that detects an electrical angle of a rotor included in the motor. The detection voltage application unit applies the detection voltage to a specific phase set in advance for each electrical angle as a phase having a remarkable variation in value of electric current in response to the voltage.

In the motor rotating with the multi-phase alternating current, as is known, a variation in inductance of each phase coil according to the electrical angle changes the relationship between the voltage applied to each phase coil and the electric current in response to the applied voltage. The variation in electrical angle also changes the effect of the error included in the source voltage with regard to each phase. The target phase suitable for specifying the effect of the error included in the source voltage is thus selected according to the electrical angle. The above application utilizes such characteristics and selects the target phase suitable for specification of the error according to the electrical angle, thus ensuring accurate specification of the error. From this point of view, the target phase suitable for specification of the error may be selected arbitrarily as the phase having a remarkable variation in value of electric current by taking into account the accuracy of the electric current detection unit. This is not restricted to the phase having a maximum variation in value of electric current at each electrical angle.

In another embodiment, when the motor controller of the present invention is applied to a motor rotating with a multi-phase alternating current, the motor controller has an electrical angle detection unit that detects an electrical angle of a rotor included in the motor. The detection voltage application unit applies the detection voltage in a predetermined direction, which rotates with a rotation of the rotor and is specified by the observed electrical angle.

In the above application, it is not required to store the relationship between the detection voltage and the electric current with regard to each phase nor to select the target phase suitable for specification of the error. This arrangement thus desirably reduces the required storage capacity and simplifies the whole series of processing. The motor rotating with the multi-phase alternating current is driven by the revolving magnetic field, which rotates synchronously with the rotor. Vector control is often applied to control the revolving magnetic field. The vector control sets the axis rotating with the rotation of the rotor and regulates the intensity of the magnetic field in the direction of the preset axis in response to a required torque. The advantage of this method is relatively easy regulation of the intensity and the direction of the magnetic field. When the vector control is adopted in control of the motor operation, the detection voltage may be applied to the axis used in the control. This desirably simplifies the general structure of the motor controller and the whole series of processing.

In the above embodiment, the predetermined direction rotating with the rotation of the rotor is not restricted to the direction used for the vector control but may be any suitable direction.

When the motor is a synchronous motor, it is desirable that the predetermined direction passes through a rotation center of the rotor and is coincident with a magnetic flux of the rotor.

In the synchronous motor, the direction that passes through the rotation center of the rotor and is coincident with the magnetic flux of the rotor (hereinafter referred to as the 'd' axis direction) and the direction perpendicular to the 'd' axis direction in the plane of rotation of the rotor (hereinafter referred to as the 'q' axis direction) are generally used for vector control. The 'q' axis direction mainly affects the generation of the motor torque. In the above application, the detection voltage is applied in the 'd' axis direction. This arrangement effectively suppresses the generation of the torque by the application of the detection voltage. This arrangement accordingly prevents the occurrence of vibrations, due to a variation in motor torque in the process of specifying the error included in the source voltage.

In the motor controller of the present invention, the specification of the error may be performed at various timings.

In one preferable embodiment, the motor controller has an error specification control unit that utilizes the voltage estimation unit, the detection voltage application unit, the electric current detection unit, and the error specification unit to specify the error, when the motor starts rotation.

The motor controller of this application specifies the error only at the activation time when the motor starts rotation. In general, the source voltage does not significantly vary during the operation of the motor. In the case of measuring the voltage with a sensor, there is no significant variation in offset during the motor rotation. At the time of motor activation, on the contrary, the estimated source voltage often includes a significant error, due to the environmental conditions during the motor stop. The motor controller of the above application specifies the error at the motor activation time, thus enabling the operation of the motor to be adequately controlled even at the beginning of the motor operation. The arrangement of not specifying the error after the start of the motor operation desirably shortens the time required for the motor control during its operation and enables the motor to be adequately controlled during high-speed operation.

In the motor controller of the present invention, the voltage estimation unit, the detection voltage application unit, the electric current detection unit, and the error specification unit may be activated just once to specify the error. In another preferable embodiment, the motor controller has an error convergence control unit that reflects the error specified by the error specification unit on the estimation carried out by the voltage estimation unit, and iteratively utilizes the voltage estimation unit, the detection voltage application unit, the electric current detection unit, and the error specification unit to make the error converge within a predetermined range.

The arrangement of using the respective units only once advantageously shortens the time required for specification of the error. The arrangement of iteratively using the respective units for convergence of the error, on the other hand, advantageously specifies the error with a higher accuracy and ensures accurate control of the motor operation. The application including the error convergence control unit is especially preferable when the relationship between the error of the source voltage and the value of electric current in response to the applied voltage has a significant degree of non-linearity.

In the motor controller of the present invention, the specified error may be reflected on the motor control in various manners.

In one preferable embodiment, the voltage application control unit has: a torque voltage setting unit that sets a torque voltage to be applied to the coil in response to a required torque to be output from the motor; and a unit that applies the torque voltage by taking into account the error.

This application enables the appropriate torque voltage to be applied by taking into account the error included in the source voltage. The output torque of the motor is thus made coincident with the required torque with high accuracy. A variety of methods may be adopted in reflection of the specified error. A first available method reflects the specified error on the source voltage itself used to set the duty based on the target voltage to be applied. In this case, the estimated voltage may be corrected with the specified error. When the true value of the source voltage is specified by the error specification unit, the estimated voltage may be replaced with the true value. A second available method corrects a preset duty, which has been set tentatively based on the estimated source voltage, with the error specified by the error specification unit. Another available method corrects the value of torque voltage with the specified error.

In the case where the motor is a salient-pole synchronous motor, the specified error may be reflected on the motor control in the following application.

In this application, the motor controller has an electrical angle computation unit that computes an electrical angle of the coil, based on a preset electrical angle detection voltage applied to the coil and an observed value of electric current running in response to the applied voltage. The operation control unit applies the electrical angle detection voltage by taking into account the error.

This application uses the electrical angle computation unit that detects the electrical angle of the salient-pole synchronous motor in a sensor-less manner. The sensor-less computation of the electrical angle is attained by utilizing the relationship between the detection voltage applied to the coil and the value of electric current running through the coil in response to the applied voltage. This arrangement enables the appropriate detection voltage to be applied by taking into account the error of the source voltage. This leads to accurate computation of the electrical angle and ensures adequate control of the motor operation.

The following describes one typical method of sensor-less computation of the electrical angle. On the premise that the motor is driven at a relatively high speed, the electrical angle is calculated according to voltage equations (1) and (2) given below:

$$Vd - R \cdot Id - p(Ld \cdot Id) + \omega \cdot Lq \cdot Iq = 0 \quad (1)$$

$$Vq - R \cdot Iq - p(Lq \cdot Iq) - \omega \cdot Ld \cdot Id - E = 0 \quad (2)$$

Here V denotes the voltage applied to the motor, I denotes the value of electric current running through the motor coiling, and L denotes the inductance of the coiling. The subscripts 'd' and 'q' attached to V, I, and L represent the values in the 'd' axis direction and in the 'q' axis direction of the motor, respectively. In the above equations, R denotes the resistance of the motor coiling, ω denotes the electrical rotational angular velocity of the motor, and E denotes the electromotive force generated by rotation of the motor. The electrical angular velocity ω is obtained by multiplying the mechanical angular velocity of the motor by the number of pole pairs. In the above equations, p is a time differential operator and is expressed as:

$$p(Ld \cdot Id) = d(Ld \cdot Id)/dt$$

The above voltage equations (1) and (2) are always held with regard to the axis 'd' and the axis 'q'. In the sensor-less motor control, the motor controller first solves the above equations, based on a certain estimated electrical angle θc (see FIG. 4). The result includes an arithmetic error corresponding to an error angle Δθ between the estimated electrical angle θc and the actual electrical angle θ. Calculating the voltage equations (1) and (2) with the calculated values of electric currents and voltages makes these equations not equal to 0. Correction by taking into account the errors of the equations (1) and (2) calculated with the electrical angle at the previous timing and the voltages and electric currents at the current timing specifies the electrical angle at the current timing.

A concrete example of the computation of the electrical angle is given below. Substitution of the time difference (variation/time) into the time differential (d/dt) in the voltage equations (1) and (2) gives equations (3) to (5):

$$\Delta Id = Id(n) - Idm \quad (3)$$
$$= Id(n) - Id(n-1) - t(Vd - RId + \omega LqIq)/Ld$$

$$\Delta Iq = Iq(n) - Iqm \quad (4)$$
$$= Iq(n) - Iq(n-1) - t(Vq - RIq - \omega LdId - E(n-1))/Lq$$

$$E(n) = E(n-1) - kk1 \cdot \Delta Iq \quad (5)$$

Here Id and Iq denote the electric currents of the axes 'd' and 'q', that is, the magnetizing current and the torque current. Ld and Lq denote the inductances in the 'd' axis direction and the 'q' axis direction. Vd and Vq denote the voltages applied to the coils. The suffixes such as (n) attached to the respective variables are on the premise that the operation is periodically repeated; (n) represents the value at the current timing and (n−1) represents the value at the previous timing. Idm and Iqm show theoretical values of electric currents calculated according to the voltage equations on the assumption that model values of the magnetizing current and the torque current, that is, the estimated electrical angle, are correct. The period of the operation is the time 't' in the above equations.

The time differential term of each voltage equation is expanded as given below, on the premise that the inductance is fixed:

$$p(Ld \cdot Id) = Ld \cdot p(Id)$$

p(Lq·Iq) is expanded similarly.

In the above equations, ω denotes the rotational angular velocity of the motor and is expressed by the unit of rad/sec. The angular velocity ω is related to the revolving speed N (rpm) of the motor and the number of pole pairs Np and is expressed as ω=2π·Np·N/60. Here kk1, which relates the electromotive forces E(n) and E(n−1) to ΔIq, represents a gain used for the computation of the electrical angle and is experimentally determined.

The electrical angle θ(n) at the current timing is calculated from the electrical angle θ(n−1) at the previous timing according to equation (6) given below using the calculated values of ΔId, ΔIq, and E(n):

$$\theta(n) = \theta(n-1) + tE(n)/kk2 + sgn \cdot kk3 \cdot \Delta Id \quad (6)$$

Here sgn is '+' when ω>0 and '−' when ω<0. Since the above discussion is on the premise that the motor is driven at a high speed, the motor stop condition, that is, the condition of ω=0, is not considered. Like kk1, kk2 and kk3 represent gains used for the computation of the electrical angle and are determined experimentally.

A diversity of methods other than the method discussed above have been proposed for the sensor-less detection of the electrical angle. Any proposed method computes the electrical angle, based on the preset detection voltage and the value of electric current in response to the detection voltage. The technique of the present invention is thus not restricted to the above method but is applicable to the diversity of methods of sensor-less detection of the electrical angle, in order to enhance the accuracy of detection of the electrical angle.

In the arrangement of sensor-less detection of the electrical angle, it is desirable that the electrical angle computation unit computes the electrical angle by using a physical quantity, which is not affected by a potential error included in the electrical angle detection voltage, as a parameter, when the motor stops operation.

The effect of the error included in the estimated source voltage on the variation in electric current varies according to the electrical angle. In order to specify the error with high accuracy, it is desirable to utilize a table relating to the electrical angle for the processing. For the sensor-less detection of the electrical angle, on the other hand, it is required to apply a preset electrical angle detection voltage. There is a possibility that neither the error nor the electrical angle detection voltage is specified with a sufficient accuracy, in the case where errors are included in both the electrical angle and the estimated source voltage.

The motor controller of the above application computes the electrical angle by using a physical quantity, which is not affected by the potential error included in the electrical angle detection voltage, as the parameter when the motor stops operation. The technique disclosed in JAPANESE PATENT LAID-OPEN GAZETTE No. 7-177788 is applicable for the computation. For example, a deviation of electric current running between two phases may be used for the parameter. Using such a parameter enables the electrical angle to be accurately detected even when the estimated source voltage includes an error under the motor stop condition. The accurate detection of the electrical angle leads to accurate specification of the error included in the estimated value. The motor controller of the above application thus ensures the accurate sensor-less control.

The above description regards the case of making the error of the source voltage reflected on the control of the torque voltage and the case of making the error of the source voltage reflected on the electrical angle detection voltage. The error may be reflected on both or either one of the control of the torque voltage and the electrical angle detection voltage.

The technique of the present invention is not restricted to the motor controller, but may be attained by a diversity of other applications, for example, a motor controlling method. Another application is a power output apparatus and other equipment with the motor controller of the present invention mounted thereon.

BEST MODES OF CARRYING OUT THE INVENTION

A. Construction of Apparatus

Figure 1:
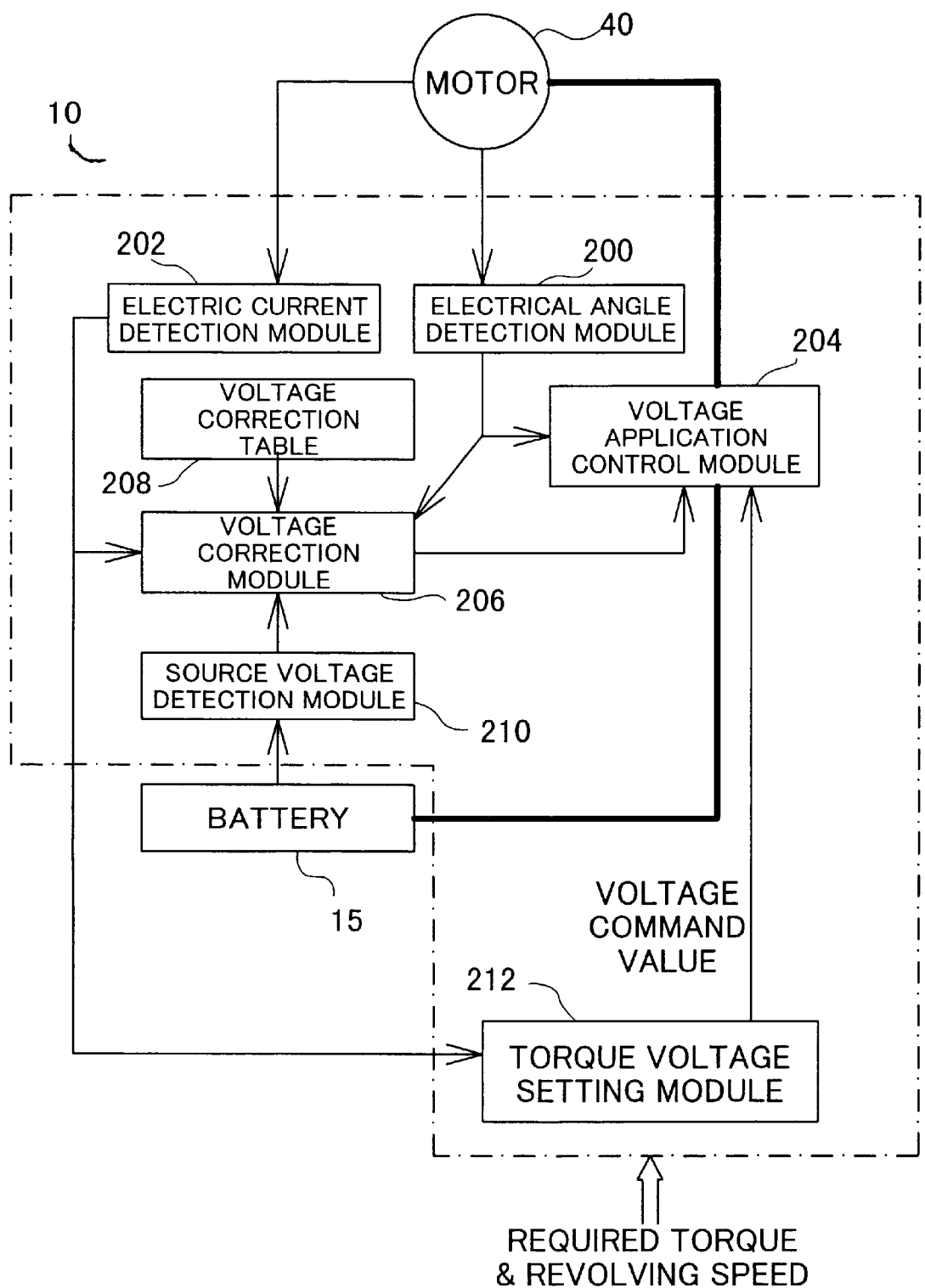
FIG. 1 shows functional blocks of a motor controller 10 in one embodiment.

FIG. 1 shows functional blocks of a motor controller 10 in one embodiment. The motor controller 10 regulates a voltage applied from a battery 15 and thereby controls the operation of a motor 40. In order to attain such control, the motor controller 10 has diverse functional blocks including an electrical angle detection module 200, an electric current detection module 202, a voltage application control module 204, a voltage correction module 206, a voltage correction table 208, a source voltage detection module 210, and a torque voltage setting module 212. The thick lines in the illustration represent a pathway of electric current between the battery 15 and the motor 40, and arrows represent transmission of signals between the respective functional blocks.

A salient-pole synchronous motor having UVW three-phase coils is applied for the motor 40. The source voltage detection module 210 measures the voltage of the battery 15, and the measurement result is transferred to the voltage correction module 206. The voltage correction module 206 specifies an error included in the observed source voltage, corrects the source voltage, and outputs the corrected value to the voltage application control module 204. At the time of starting the motor 40, however, the voltage correction module 206 can not specify the quantity of error included in the observed source voltage, so that the measurement result is directly output from the source voltage detection module 210 to the voltage application control module 204. At this moment, the source voltage including an error is accordingly transmitted to the voltage application control unit 204.

The electrical angle detection module 200 detects an electrical angle or an electrical rotational position of a rotor in the motor 40. The observed electrical angle is output to the voltage application control module 204 to be used for regulation of the voltage applied to the coils of the motor 40, while being transmitted to the voltage correction module 206 for correction of the source voltage. The voltage application control module 204 regulates the voltage applied to the coils of the motor 40. The voltage application control module 204 applies two different voltages to the motor 40. Immediately after a start-up of the motor 40, a preset detection voltage is applied as the first voltage. After the motor 40 has started the operation, a torque voltage set according to a required torque is applied as the second voltage.

When the voltage application control module 204 applies a preset detection voltage immediately after a start-up of the motor 40, electric current in response to this detection voltage runs through the corresponding coil of the motor 40. The electric current detection module 202 measures the electric current running through the coil. The measurement result is transmitted to the voltage correction module 206. The voltage correction module 206 specifies an error included in the observed source voltage based on the transmitted measurement result by a method discussed below.

As mentioned previously, immediately after the start-up of the motor 40, the voltage correction module 206 can not specify the error included in the observed source voltage for correction of the source voltage. The voltage application control module 204 accordingly applies a detection voltage, based on the observed source voltage including an error. The detection voltage applied here is naturally deviated from a predetermined value to be actually applied. The value of electric current corresponding to the detection voltage is thus deviated from a value to be actually observed. The voltage correction table 208 stores a map showing the relationship between the value of source voltage and the value of electric current running through the corresponding coil under the condition of adequate application of the detection voltage. The voltage correction module 206 refers to the voltage correction table 208 and reads the true value of the source voltage mapped to the observed electric current, which runs corresponding to the applied detection voltage, so as to specify an error included in the observed source voltage. The voltage correction module 206 then corrects the measurement result of the source voltage detection module 210 and outputs an appropriate source voltage to the voltage application control module 204.

The voltage application control module 204 also functions to apply a torque voltage or a voltage for making the motor 40 output a torque. The torque voltage setting module 212 sets the torque voltage corresponding to an externally input required torque. The technique of the embodiment sets the torque voltage by proportional-integral control, based on the value of electric current observed by the electric current detection module 202. After the motor 40 has started the operation, since the appropriate value of the source voltage is transmitted from the voltage correction module 206, the voltage application controller 204 can adequately apply the torque voltage to the coils.

Figure 2:
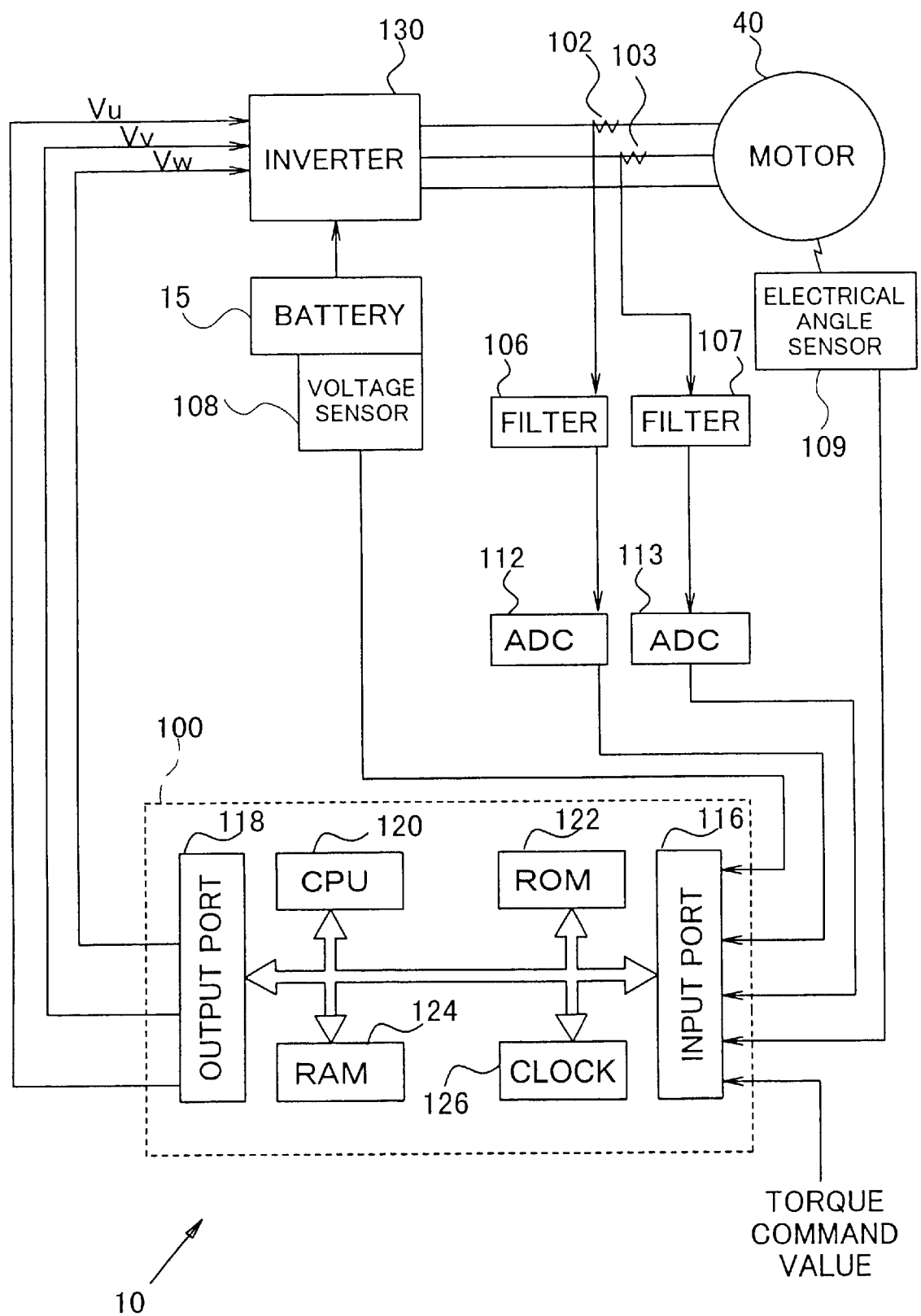
FIG. 2 schematically illustrates the structure of the motor controller 10.

FIG. 2 schematically illustrates the structure of the motor controller 10. In this embodiment, the motor controller has a control unit 100 constructed as a microcomputer. The control unit 100 includes a CPU 120, a ROM 122, and a RAM 124 that are used for executing diverse control operations, an input port 116 and an output port 118 that are used for transmission of data to and from the outside, and a clock 126 that synchronizes the whole operation timings.

Signals input into the control unit 100 are output from an electrical angle sensor 109 that measures the electrical angle of the motor 40, a voltage sensor 108 that measures the voltage of the battery 15, and electric current sensors 102 and 103 that measure electric currents running through the U phase and the V phase of the motor 40. The signals from the electric current sensors 102 and 103 pass through filters 106 and 107 for removal of high-frequency noises, are converted into digital signals by ADCs 112 and 113, and are input into the control unit 100. The control unit 100 also receives an externally given torque command value. No electric current sensor is provided for the W phase. In the three-phase alternating currents running through the coils of the synchronous motor 40, the sum of the electric currents of the U, V, and W phases is always kept equal to zero. The electric current of the W phase is thus calculated from the electric currents of the U and V phases.

The voltage of the battery 15 is applied to each coil of the motor 40 via an inverter 130. The inverter 130 is constructed as a transistor inverter including a total of six transistors or three transistor pairs in a main circuit, where each pair of transistors consists of one transistor connecting with the source of the battery 15 and the other transistor connecting with the sink of the battery 15 with regard to each of the UVW phases. The control unit 100 outputs a control signal to on and off the respective transistors included in the inverter 130. The control unit 100 regulates a duty or an on-off rate of the transistors in the inverter with the control signal, thus adjusting voltage applied to each coil of the motor 40. The duty is set according to the observed source voltage and the voltage to be applied. Here it is assumed that a fixed voltage is to be applied. In the case of a high source voltage, it is required to relatively lower the on rate of the transistors on the source side. This leads to a low duty. In the case of a low source voltage, on the other hand, it is required to relatively heighten the on rate of the transistors on the source side. This, leads to a high duty. In this manner, the control unit 100 sets the duty according to both the observed voltage of the battery 15 and the voltage to be applied.

The constituents of the hardware structure (FIG. 2) of the motor controller 10 are mapped to the functional blocks (FIG. 1) in the following manner. The electric current sensors 102 and 103, the filters 106 and 107, and the ADCs 112 and 113 in FIG. 2 correspond to the electric current detection module 202 of the functional block. The voltage sensor 108 corresponds to the source voltage detection module 210, and the electrical angle sensor 109 corresponds to the electrical angle detection module 200. The electrical angle detection module 200 may detect the electrical angle in a sensor-less manner, but the structure of the first embodiment applies the electrical angle sensor 109, which utilizes a Hall element for detection of the electrical angle. The inverter 130 and the control unit 100 correspond to the voltage application control module 204 of FIG. 1. The control unit 100 also corresponds to the other functional blocks in FIG. 1.

Figure 3:
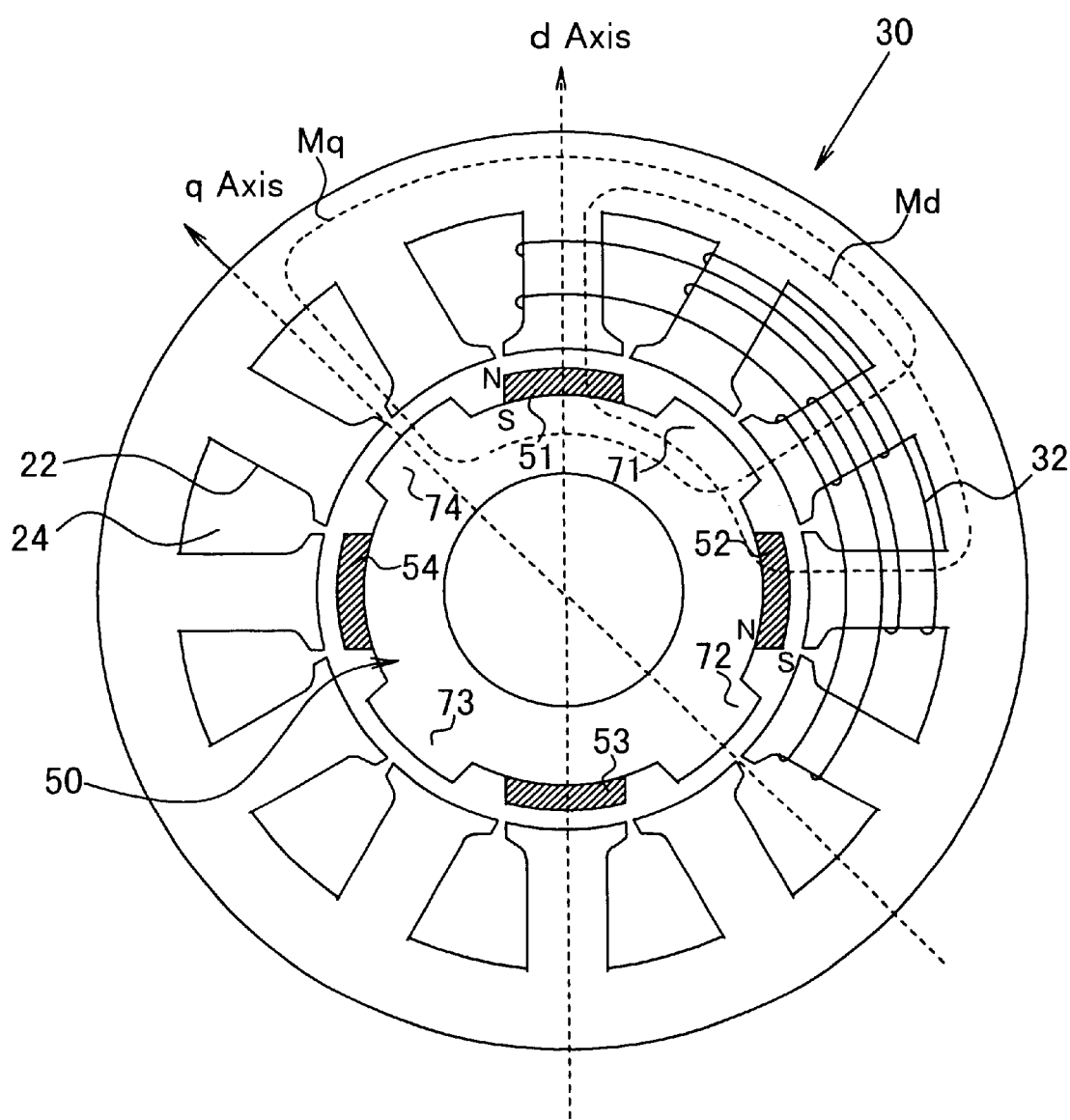
FIG. 3 schematically illustrates the structure of a three-phase synchronous motor 40.

FIG. 3 schematically illustrates the structure of the three-phase synchronous motor 40. The three-phase synchronous motor 40 includes a stator 30 and a rotor 50. The rotor 50 has four salient poles 71 through 74 at orthogonal positions. Permanent magnets 51 through 54 are attached to the respective intermediate positions of the adjoining salient poles 71 through 74. The permanent magnets 51 through 54 are magnetized in a radial direction of the rotor 50, and the magnetism is set to make the adjoining magnets have opposite magnetic poles. For example, the permanent magnet 51 has an N pole on the outer circumferential face thereof, whereas the adjoining permanent magnet 52 has an S pole on the outer circumference thereof. The permanent magnets 51 and 52 form a magnetic path Md that penetrates the rotor 50 and the stator 30. In this embodiment, the motor 40 is a non-sinusoidal wave polarized motor, in which the distribution of magnetic fluxes by the permanent magnets 51 through 54 does not form a sinusoidal wave in the circumferential direction of the rotor 50. A sinusoidal wave polarized motor may, however, be used instead.

The stator 30 has a total of twelve teeth 22. A coil 32 for making the stator 30 generate a revolving magnetic field is wound on slots 24 formed between adjoining teeth 22. When an exciting current is supplied to the coil 32 with a view to generating a revolving magnetic field, a magnetic path Mq is formed to penetrate the adjoining salient poles, the rotor 50, and the stator 30.

The magnetic flux formed by the permanent magnet 51 goes through the center of the rotation axis and penetrates the rotor 50 in the diametral direction. This diametral axis of penetration is called an axis 'd'. Another axis 'q' is electrically perpendicular to the axis 'd' in the plane of rotation of the rotor 50. The axes 'd' and 'q' rotate with a rotation of the rotor 50. In this embodiment, since the permanent magnets 51 and 53 attached to the rotor 50 have the N pole on the outer circumferential faces thereof and the permanent magnets 52 and 54 have the S pole on the outer circumferential faces thereof, the axes 'd' and 'q' are geometrically located at an angle of 45 degrees.

Figure 4:
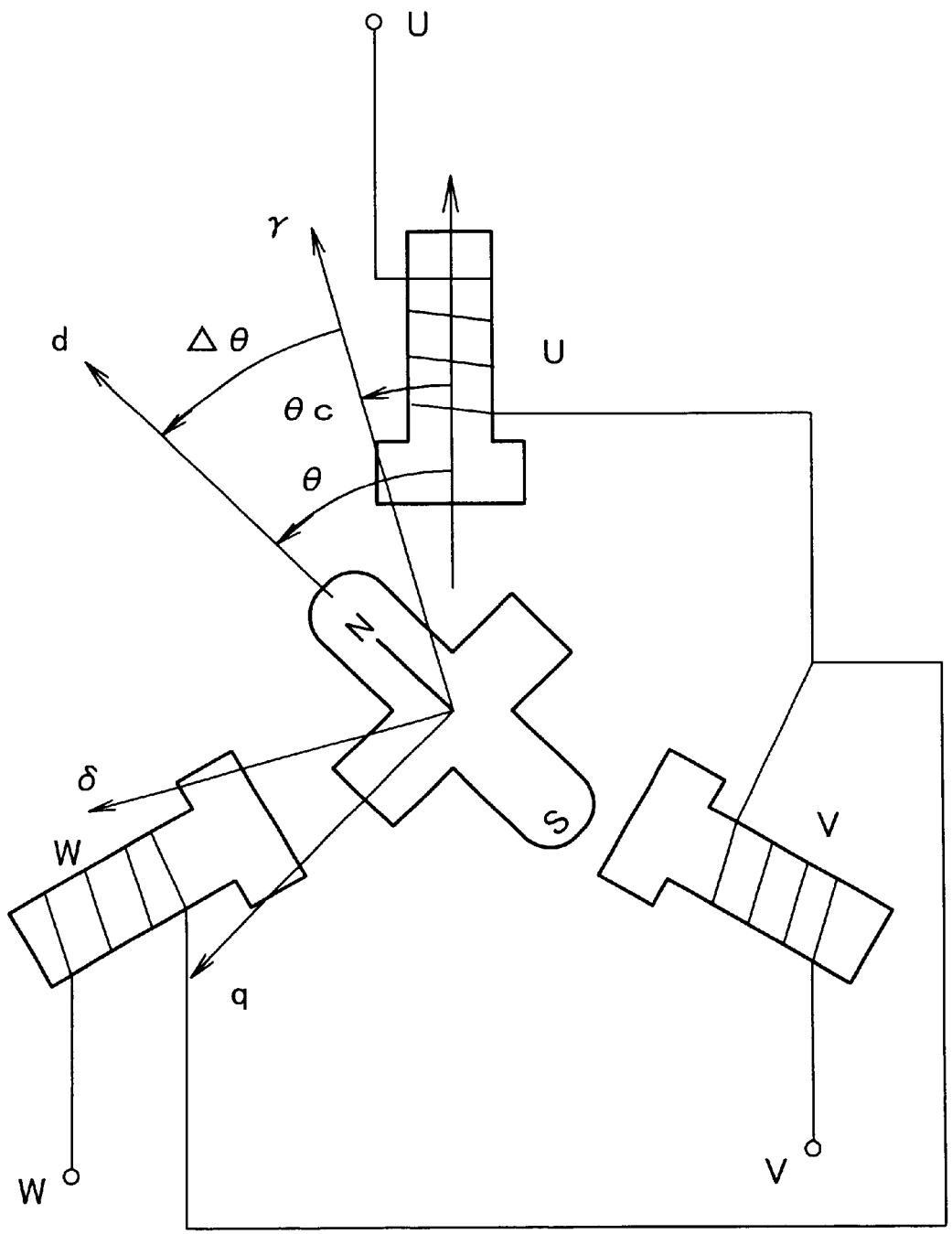
FIG. 4 shows an equivalent circuit to the three-phase synchronous motor 40.

FIG. 4 shows an equivalent circuit to the three-phase synchronous motor 40. The three-phase synchronous motor 40 is expressed by an equivalent circuit having UVW three-phase coils and a permanent magnet rotating around the center of the rotation axis. In this equivalent circuit, the axis 'd' penetrates the permanent magnet with its N pole as the positive direction. The electrical angle is a rotational angle θ of the axis 'd' relative to an axis penetrating the U-phase coil. The technique of the embodiment carries out vector control, which treats electric currents as vectors, and controls the operation of the motor 40 with the electrical angle θ.

The vector control is discussed below with referring to FIG. 4. In the example of FIG. 4, supply of an electric current Iu to the U phase generates a magnetic field. This magnetic field is formed in a direction penetrating the U phase, and the magnitude of the magnetic field varies with a variation in electric current Iu. Namely the U-phase current is expressed as a vector having the direction of this magnetic field and the magnitude Iu. In a similar manner, electric current Iv and Iw running through the other phases V and W are expressed as vectors. Each electric current vector in the plane is accordingly expressed as the sum of electric current vectors in typical two directions. When the two typical directions are set to the axes 'd' and 'q', each electric current vector corresponding to a magnetic field generated in an arbitrary direction in the plane of rotation of the motor is expressed with electric currents Id and Iq in these two directions.

The following equations are used to calculate electric currents Id and Iq from the electric current Iu and Iv running through the U and V phases. This is three phase-to-two phase conversion.

$$Id=(-Iu\cdot\sin(\theta-120)+Iv\cdot\sin\theta)\cdot\sqrt{2}$$

$$Iq=(-Iu\cdot\cos(\theta-120)+Iv\cdot\cos\theta)\cdot\sqrt{2}$$

The following equations are used, on the contrary, to calculate electric currents Iu, Iv, and Iw of the respective UVW phases from the specified Id and Iq values, on the premise that the sum of the electric currents of the U, V, and W phases is equal to 0 (Iu+Iv+Iw=0). This is two phase-to-three phase conversion.

$$Iu=(Id\cdot\cos\theta-Iq\cdot\sin\theta)\cdot\sqrt{2/3}$$

$$Iv=(Id\cdot\cos(\theta-120)-Iq\sin(\theta-120)\cdot\sqrt{2/3}$$

$$Iw=-Iu-Iv$$

According to the above equations, specification of the electric currents running through the axis 'd' and the axis 'q' of the motor results in determining the electric currents to be actually run through the U, V, and W phases. This also determines the voltages to be applied to the respective U, V, and W phases. The intensities of the electric currents to be run through the axis 'd' and the axis 'q' are set in advance corresponding to a required torque and are stored in the form of a table. The procedure of the embodiment refers to the table, reads the electric currents to be run through the axes 'd' and 'q' corresponding to the required torque from the table, and carries out the two phase-to-three phase conversion to set target electric currents to be run through the U, V, and W phases. The procedure then carries out proportional-integral control to set target voltages to be applied to the respective phases, based on the deviations of the actually observed electric currents from the target electric currents.

B. Motor Control Process

Figure 5:
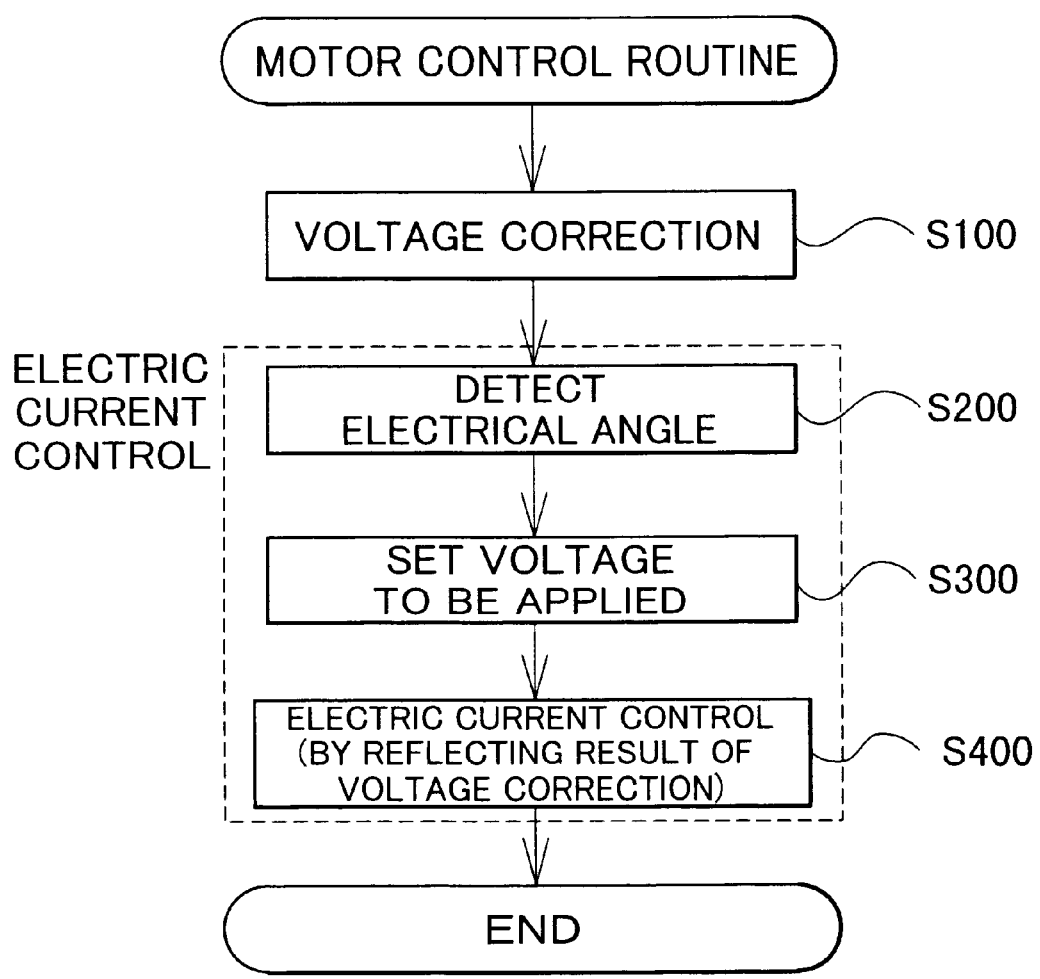
FIG. 5 is a flowchart showing a motor control routine.

The following describes a motor control process executed in this embodiment. FIG. 5 is a flowchart showing a motor control routine, which is executed by the CPU 120 of the control unit 100. When the program enters this routine, the CPU 120 first carries out voltage correction (step S100). The process of voltage correction specifies an error included in the observed voltage of the battery 15 by the voltage sensor 108 and corrects the observed voltage.

Figure 6:
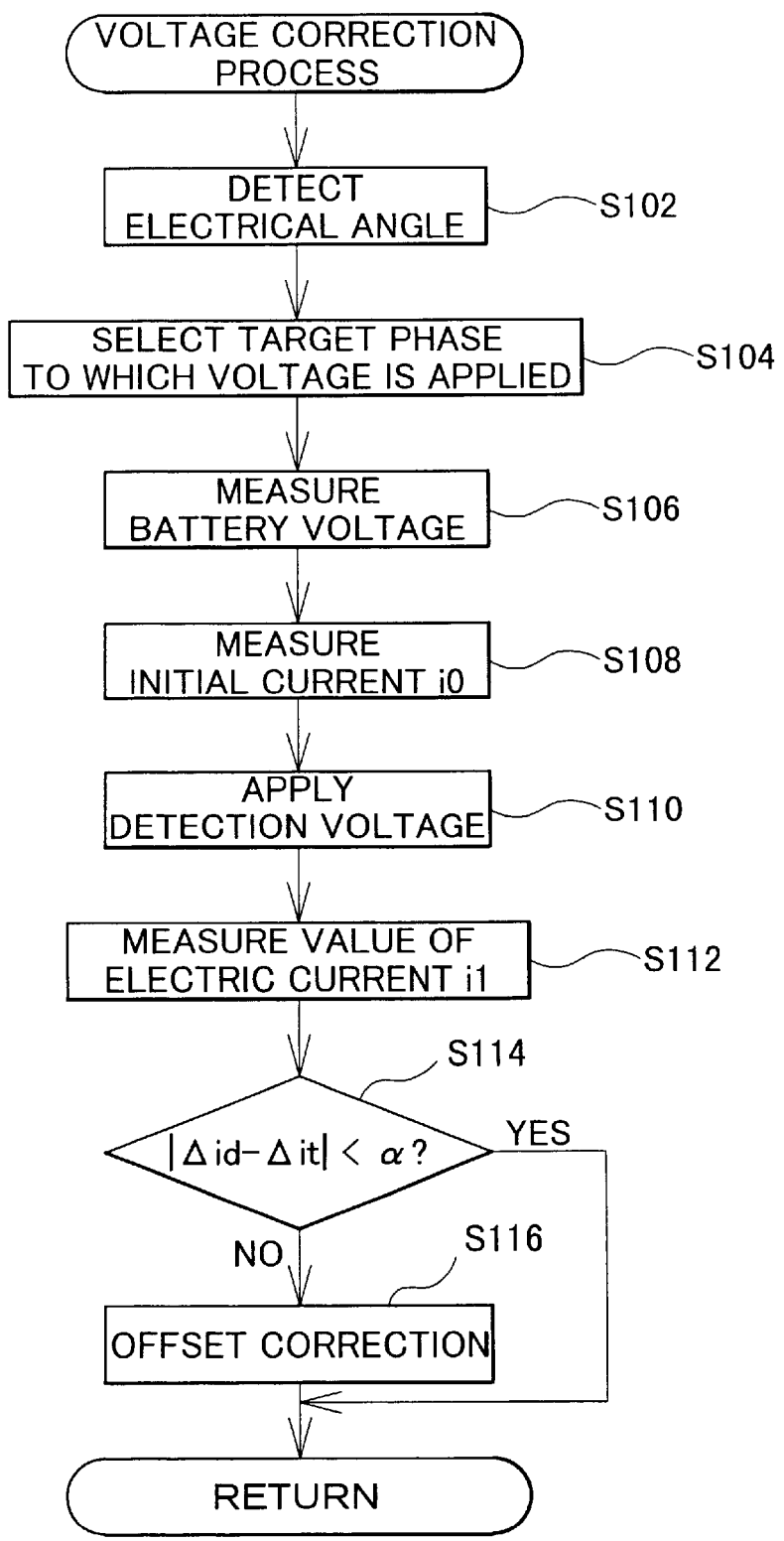
FIG. 6 is a flowchart showing a routine of voltage correction.

FIG. 6 is a flowchart showing a routine of the voltage correction. When the program enters the voltage correction routine, the CPU 120 first detects the electrical angle (step S102). The electrical angle is measured with the electrical angle sensor 109. The CPU 120 then selects a target phase, to which a detection voltage is applied for specification of the error, among the U, V, and W phases (step S104). In this embodiment, the target phase, to which the voltage is applied, is set in advance according to the electrical angle. The CPU 120 carries out the selection of the target phase, based on the setting. The method of setting the target phase will be discussed later.

After setting the target phase to which the voltage is applied, the CPU 120 measures the voltage of the battery 15 (step S106) and an initial current i0 running through the corresponding coil (step S108). The voltage sensor 108 and the electric current sensors 102 and 103 are used for the measurement. The initial current i0 represents the value of electric current in the target phase selected at step S104.

The CPU 120 subsequently applies a detection voltage to the target phase selected at step S104 (step S110). The detection voltage is applied by switching the inverter 130 at a fixed duty. An appropriate value is set for the duty by taking into account the available voltage of the battery 15 and the accuracy of measurement of the electric current running through the coil. Switching the inverter 130 at the preset duty causes the battery 15 to apply a voltage to the coil. Electric current runs through the coil in response to the applied voltage. The CPU 120 measures a value of electric current i1 after the application of the detection voltage with the electric current sensors 102 and 103. The CPU 120 then subtracts the initial current i0 from the observed value of electric current i1 to calculate a variation Δid in electric current in response to the detection voltage (step S112).

The CPU 120 subsequently determines whether or not the difference between the calculated variation Δid in electric current and an expected variation Δit in electric current, which is to be observed in response to the voltage measured at step S106, is within a preset range α (step S114). The voltage measured at step S106 may include an error. Especially on the start-up of the motor 40, that is, immediately after the start of the motor control routine of FIG. 5, a significant offset error may arise, due to the effects of the environment where the motor controller is located. When there is an offset error, switching the inverter 130 at a preset duty causes a voltage different from a required voltage to be applied to the coil. This makes the variation Δid in electric current obtained at step S112 (hereinafter referred to as the observed value Δid) deviated from the variation Δit in electric current to be observed on the assumption that the detection voltage does not include any error (hereinafter referred to as the ideal value Δit). The quantity of deviation naturally varies according to the offset error included in the observed voltage.

When the difference between the observed value Δid and the ideal value Δit is smaller than the preset value α at step S114, it is determined that the observed voltage is substantially similar to the ideal value. In such cases, the CPU 120 exits from the voltage correction routine without any correction. When the difference is not smaller than the preset value α, on the other hand, it is determined that the observed voltage includes a significant error. In such cases, the CPU 120 carries out offset correction of the observed voltage (step S116). The preset value a is used as the criterion to determine execution or non-execution of the offset correction, and is set arbitrarily in a specific range that sufficiently reduces the effects of the offset error on the operation of the motor 40.

Figure 7:
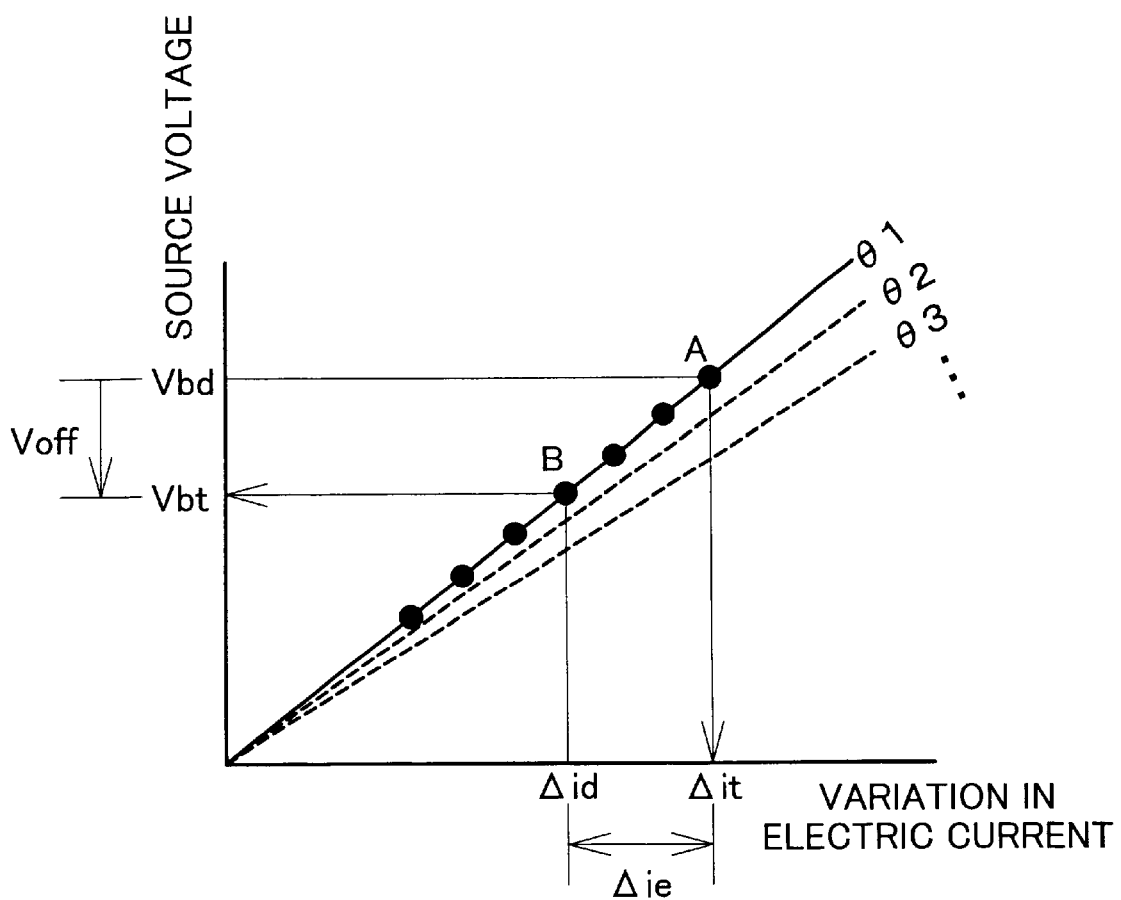
FIG. 7 shows the contents of a voltage correction table used for the process of offset correction.

The following describes the process of offset correction. FIG. 7 shows the contents of a voltage correction table used for the process of offset correction. The table stores the relationship between the source voltage and the variation in electric current when the inverter 130 is switched at a duty for application of the detection voltage. Here the source voltage represents the true value excluding any error.

Figure 8:
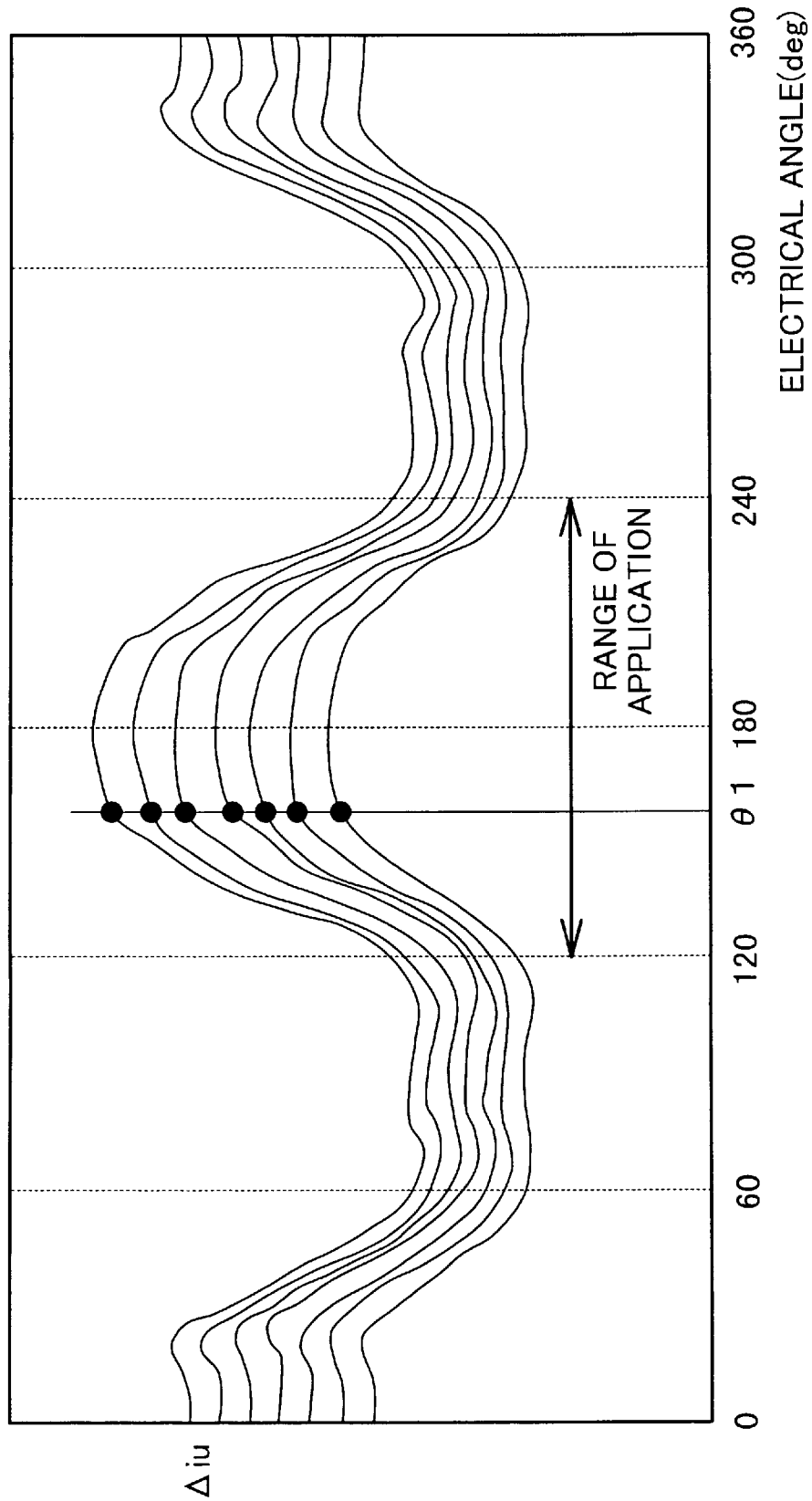
FIG. 8 is a graph showing variations in electric current in response to application of detection voltages with regard to the U phase.

The voltage correction table is set in the following manner. FIG. 8 is a graph showing variations in electric current in response to application of detection voltages with regard to the U phase. The variations in electric current are obtained when the true value of the source voltage is changed by seven stages and the voltages are applied at a preset duty for application of the detection voltage. As illustrated in the graph, the variation Δiu in electric current varies with a change of the source voltage. The value Δiu increases with an increase in source voltage. The variation Δiu in electric current also depends upon the electrical angle θ.

The voltage correction table includes plots obtained by specifying the relationship between the source voltage and the variation Δiu in electric current with regard to each electrical angle in the graph. For example, it is assumed that the voltage correction table is set corresponding to an electrical angle θ1. As shown in FIG. 8, the change of the source voltage specifies seven points of the variation Δiu in electric current with regard to the electrical angle θ1. Plotting these seven points in the map of the variation in electric current against the source voltage gives the voltage correction table of the electrical angle θ1 shown in FIG. 7. In a similar manner, voltage correction tables are prepared with regard to the respective electrical angles like θ2 and θ3. FIG. 7 only conceptually shows such voltage correction tables and do not actually correspond to experimental data of FIG. 8.

The details of the offset correction process (step S116 in FIG. 6) are discussed in the case of the electrical angle θ1. Here the observed source voltage at step S106 in FIG. 6 is equal to Vbd. When no offset error is included in the observed value, there is a variation in electric current corresponding to a point A in the voltage correction table of FIG. 7. Namely it is expected to detect a variation Δit in electric current. This value represents the ideal value at step S114.

The actually observed variation in electric current is given as the observed value Δid, which is deviated from the ideal value Δit by an error Δie. In this case, the actually applied voltage corresponds to a point B in the voltage correction table of FIG. 7. Namely the true source voltage is Vbt. The difference between the observed source voltage Vbd and the true source voltage Vbt is an offset error expressed as Voff in the graph. The offset correction process refers to the voltage correction table and specifies the offset error included in the observed source voltage, based on the ideal value Δit and the observed value Δid of the variation in electric current.

As discussed later, the structure of the embodiment sequentially detects the source voltage after the start of the operation of the motor 40. The offset correction process accordingly sets the offset error Voff as a subtrahend that is always to be deducted from the observed source voltage. In one modified application, when the source voltage is not detected after the start of the operation of the motor 40, the offset correction process may set Vbt to the value of the source voltage.

FIG. 7 shows the voltage correction table used in the case of application of the detection voltage to the U phase. As described previously at step S104 in FIG. 6, the technique of the embodiment selects the target phase, to which the detection voltage is applied, according to the electrical angle. The voltage correction tables are thus also prepared with regard to the V phase and the W phase according to the method and the form described above with FIGS. 7 and 8.

The following describes the method of selecting the target phase, to which the detection voltage is applied, according to the electrical angle and the reason thereof. As shown in FIG. 8, the variation in electric current in the U phase depends upon the source voltage and the electrical angle. As clearly understood from FIG. 8, the effect of the changing source voltage on the variation in electric current also depends upon the electrical angle. For example, there is a relatively large effect of the changing source voltage in the vicinity of the electrical angle of 180 degrees, whereas there is a relatively small effect of the changing source voltage in the vicinity of the electrical angle of 300 degrees.

Figure 9:
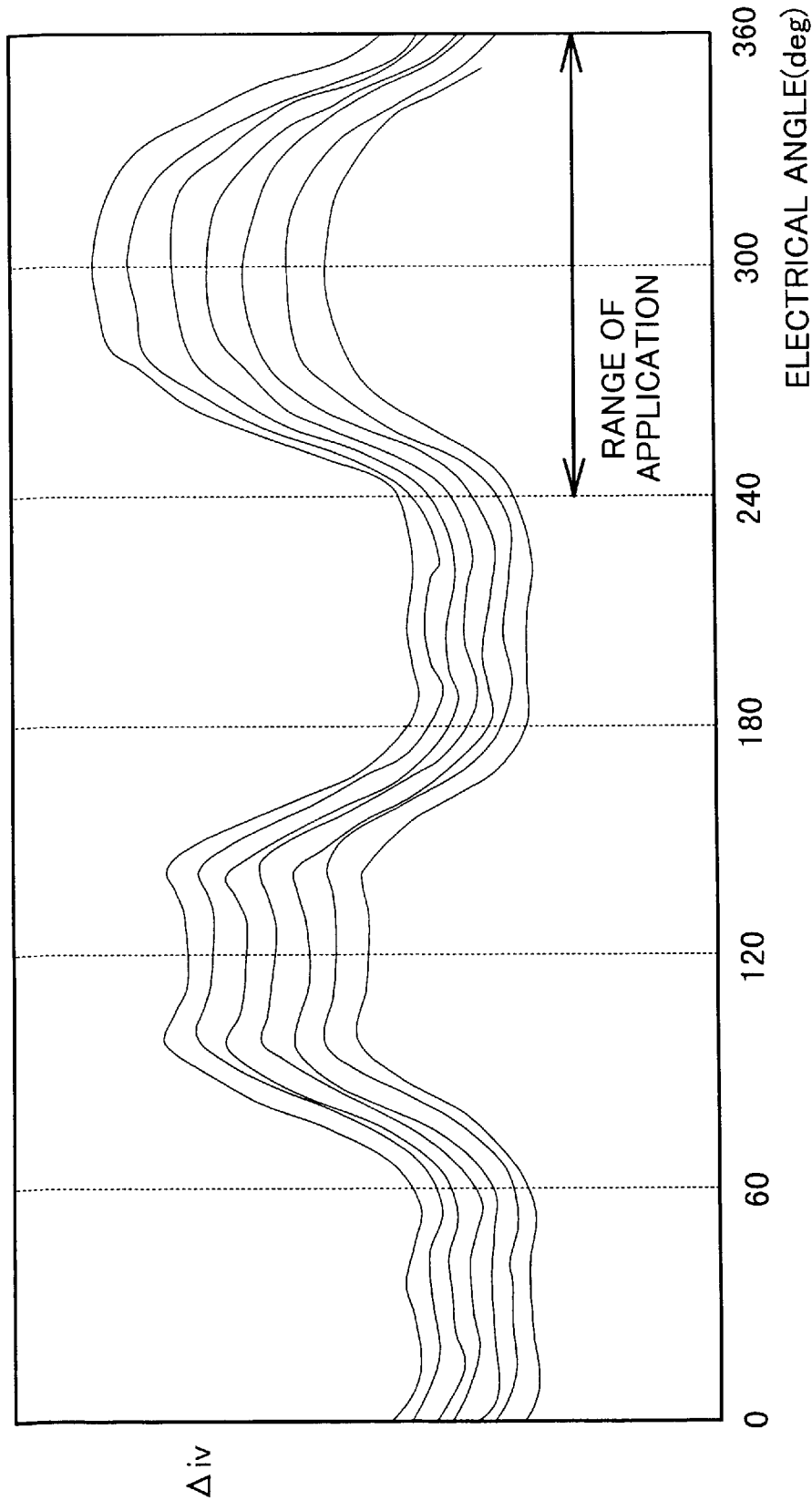
FIG. 9 is a graph showing variations in electric current in response to application of detection voltages with regard to the V phase.
Figure 10:
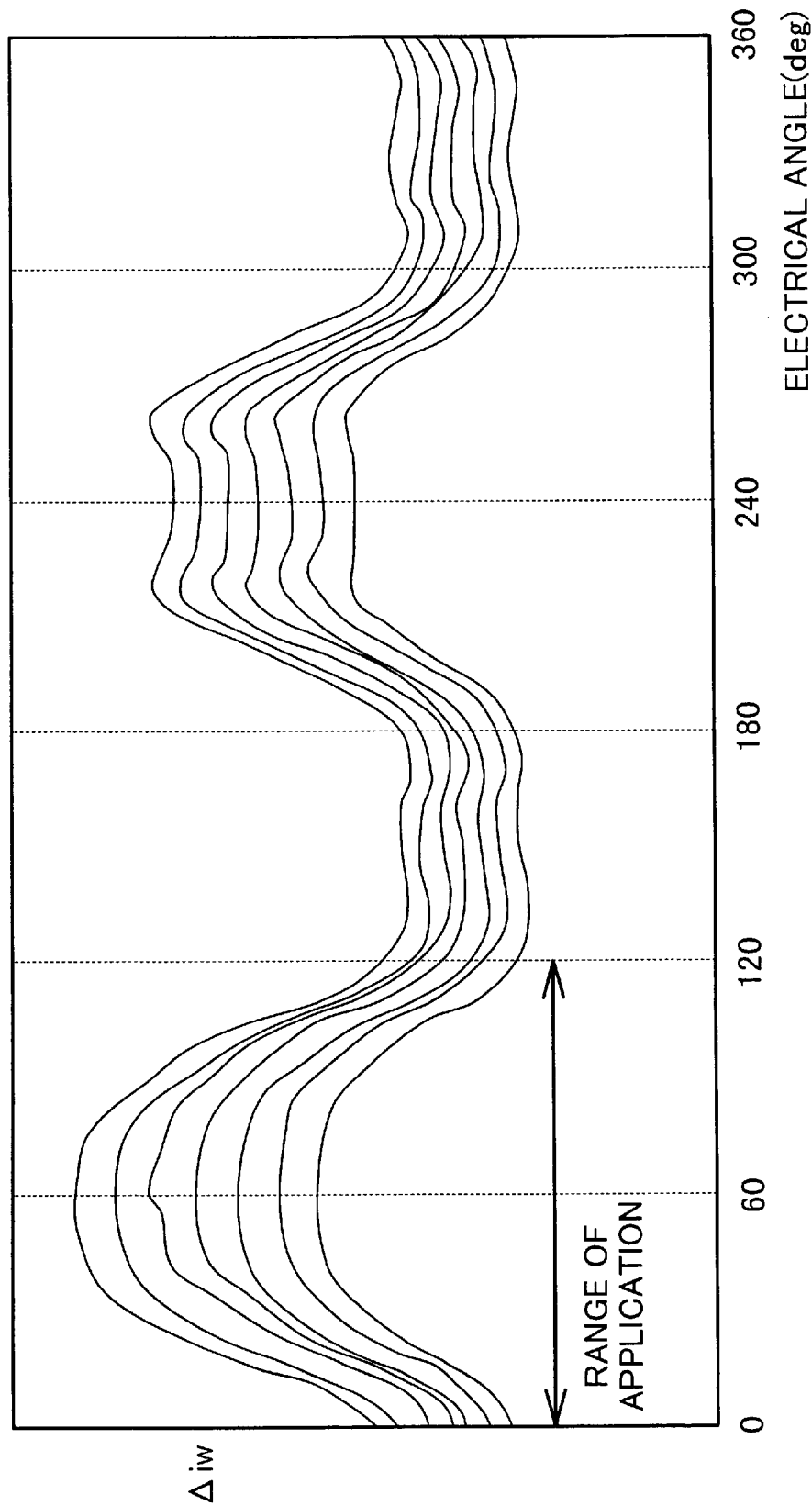
FIG. 10 is a graph showing variations in electric current in response to application of detection voltages with regard to the W phase.

Different phases have different characteristics against the electrical angle. FIG. 9 is a graph showing variations in electric current in response to application of detection voltages with regard to the V phase. FIG. 10 is a graph showing variations in electric current in response to application of detection voltages with regard to the W phase. In the V phase, there is a relatively large effect of the changing source voltage in the vicinity of the electrical angle of 300 degrees. In the W phase, there is a relatively large effects of the changing source voltage in the vicinity of the electrical angle of 300 degrees. It is desirable to use the phase having the significant effect of the error included in the observed source voltage for correction of the offset error included in the observed source voltage based on the voltage correction table. From this point of view, the technique of the embodiment divides the electrical angle in the range of 0 to 360 degrees into three sections, and selects the phase having the significant effect of the error included in the observed source voltage as the target phase, to which the detection voltage is applied, in each section. The mapping of the section to the target phase is given below:

Electrical angle: 0 to 120 degrees→application of detection voltage to W phase

Electrical angle: 120 to 240 degrees→application of detection voltage to U phase Electrical angle: 240 to 360 degrees→application of detection voltage to V phase On conclusion of the voltage correction, the CPU 120 returns to the motor control routine (FIG. 5) and carries out electric current control of the motor 40. The electric current control regulates the electric current running through the coil of the motor 40 in response to a required torque. This is equivalent to starting the normal operation of the motor 40.

The CPU 120 carries out the vector control discussed previously to regulate the electric currents running through the coils. In order to specify the directions of the axes 'd' and 'q' required for the vector control, the CPU 120 first detects the electrical angle (step S200). The electrical angle is measured with the electrical angle sensor 109. The CPU 120 then sets voltages to be applied in response to a required torque (step S300). The voltages to be applied to the axes 'd' and 'q' are set in advance corresponding to each required torque in the form of a table. The concrete procedure of step S300 refers to this table and sets the voltages to be applied.

After setting the voltages, the CPU 120 controls the electric currents to be run through the respective phases (step S400). The concrete procedure of the electric current control carries out the two phase-to-three phase conversion discussed previously and the proportional integral control to specify the voltages to be applied to the respective phases, sets a duty of the inverter 130 based on the specified voltages, and performs the PWM control of the switching operations of the inverter 130 to attain the preset duty. The duty is set according to the observed voltage of the battery 15 and the voltage to be applied. The offset error specified by the voltage correction is reflected on the setting. The concrete procedure subtracts the offset error Voff from the observed voltage, which is sequentially measured with the voltage sensor 108, to calculate the appropriate value of source voltage, and subsequently sets the duty. The CPU 120 iteratively carries out the electric current control of steps S200 to S400 according to the required value, until receiving an instruction to stop the operation of the motor.

As described above, the motor controller of this embodiment specifies the offset error included in the observed voltage of the battery 15 for correction, and enables an appropriate voltage corresponding to a required torque to be applied to the coils of the motor 40. This arrangement ensures quick output of the required torque from the motor 40 and enables accurate control with good response.

The above embodiment uses the voltage correction table representing the relationship between the source voltage and the variation in electric current. A diversity of other settings may be applied for the voltage correction table. One modified example of the voltage correction table represents the relationship between the actually applied voltage and the variation in electric current. In this case, the actually applied voltage is plotted as ordinate in the table of FIG. 7. The procedure of the embodiment switches the inverter 130 at a fixed duty to apply the detection voltage. In the case of using the voltage correction table of the modified example, the procedure applies a preset fixed voltage Vbd as the detection voltage. In the event that no error is included in the observed source voltage, it is expected that the duty is set adequately and the ideal value $\Delta it$ of the variation in electric current is detected. When the observed variation in electric current is $\Delta id$, however, the actually applied voltage Vbt and the error Voff are specified by referring to the voltage correction table. The error Voff of the actually applied voltage is unequivocally mapped to the error of the source voltage. The error of the source voltage can thus be specified by using the voltage correction table of the modified example.

Figure 11:
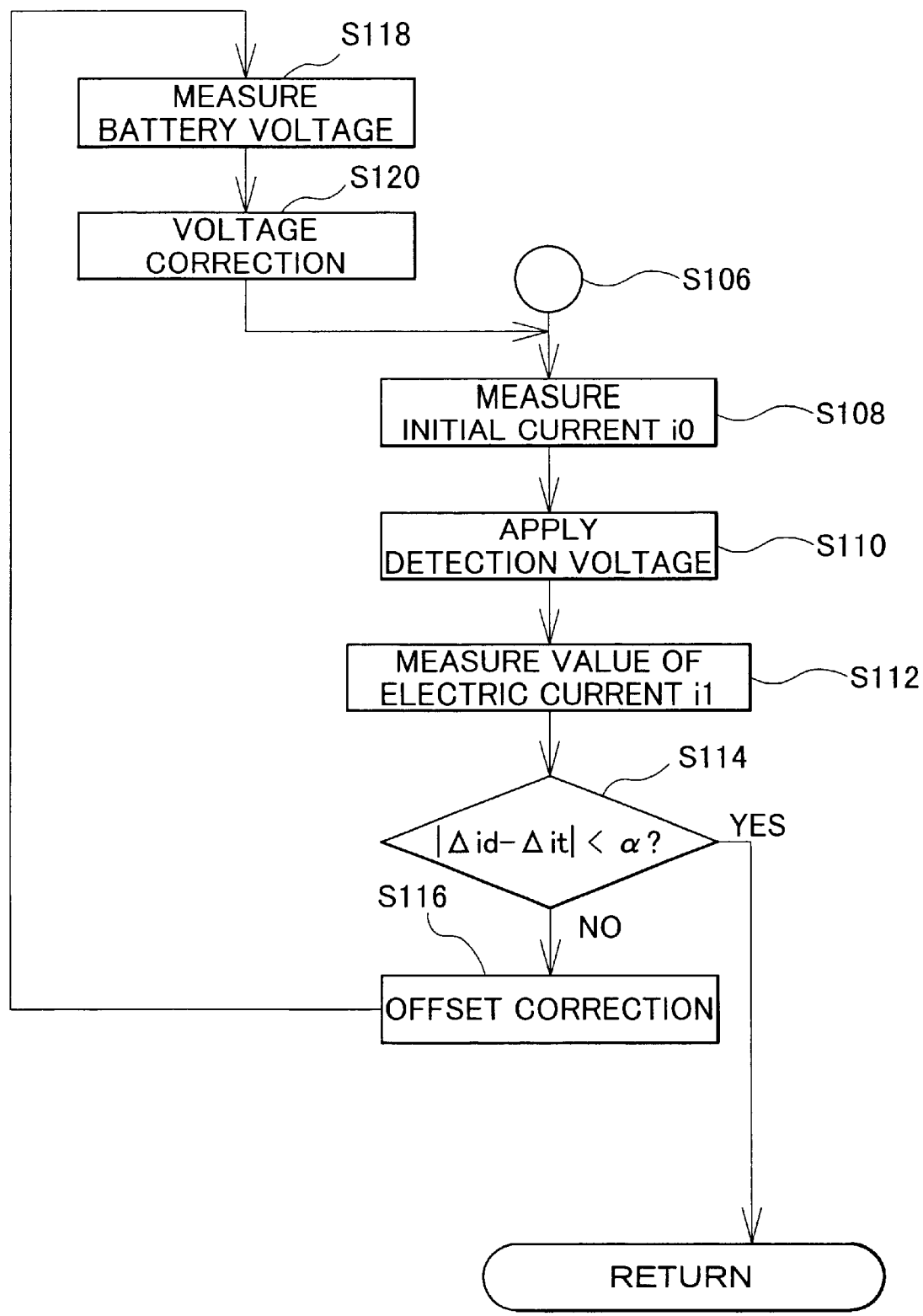
FIG. 11 is a flowchart showing a modified voltage correction routine.

The procedure of the above embodiment carries out the offset correction only once in the voltage correction process (see FIG. 6). The offset correction may, however, be performed in an iterative manner. The voltage correction process of this application is discussed below as one possible modification. FIG. 11 is a flowchart showing a modified voltage correction routine. The processing of steps S106 to S116 in the modified routine is identical with that of FIG. 6. This modified procedure, however, uses the voltage correction table of the modified example described above, that is, the table representing the relationship between the actually applied voltage and the variation in electric current.

In the modified voltage correction process, the series of processing after the offset correction (step S116) is different from that of the above embodiment (see FIG. 6). In the modified routine, after the offset correction, the CPU 120 again measures the voltage of the battery 15 (step S118) and causes the newly observed voltage to undergo the voltage correction (step S120). The offset error of the observed value is specified by the offset correction (step S116). The process of step S120 thus subtracts the specified offset error from the newly observed voltage.

The CPU 120 again carries out the series of processing to apply the detection voltage and measure the variation in electric current, based on the corrected voltage (steps S108 to S112). In the case of application of the voltage correction table of the modified example, the duty of the detection voltage is set according to the value of the source voltage. The process of step S110 thus applies the detection voltage at a different duty from that of the first cycle. This naturally leads to a different variation in electric current. The CPU 120 determines whether or not the error or the difference between the observed variation in electric current and the ideal value is within the preset range $\alpha$ (step S114). When the difference is not smaller than the preset range $\alpha$, the CPU 120 again carries out the offset correction (step S116). The CPU 120 iteratively performs the above series of processing until the error or the difference between the observed variation in electric current and the ideal value converges in the preset range $\alpha$.

The modified voltage correction process ensures the more accurate correction of the offset error. As shown in the graphs of FIGS. 8 to 10, the effect of the error included in the source voltage on the variation in electric current may have a significant degree of non-linearity. When the effect has a large degree of non-linearity, only one cycle of offset correction may not sufficiently correct the offset error. The modified voltage correction process enables the adequate correction of the offset error even in such cases, thus ensuring the appropriate motor control.

The procedure of the embodiment discussed above applies the detection voltage to one of the U, V, and W phases selected according to the electrical angle. As clearly understood from the graphs of FIGS. 8 to 10, the effect of the error included in the source voltage appears over the whole range of the electrical angle in any phase. The offset correction may thus be carried out only for a fixed phase, for example, the U phase. Application of the detection voltage is not restricted to the U, V, and W phases, but may be in any directions. For example, the detection voltage may be applied to an axis rotating with the rotor, especially the axis 'd'.

Figure 12:
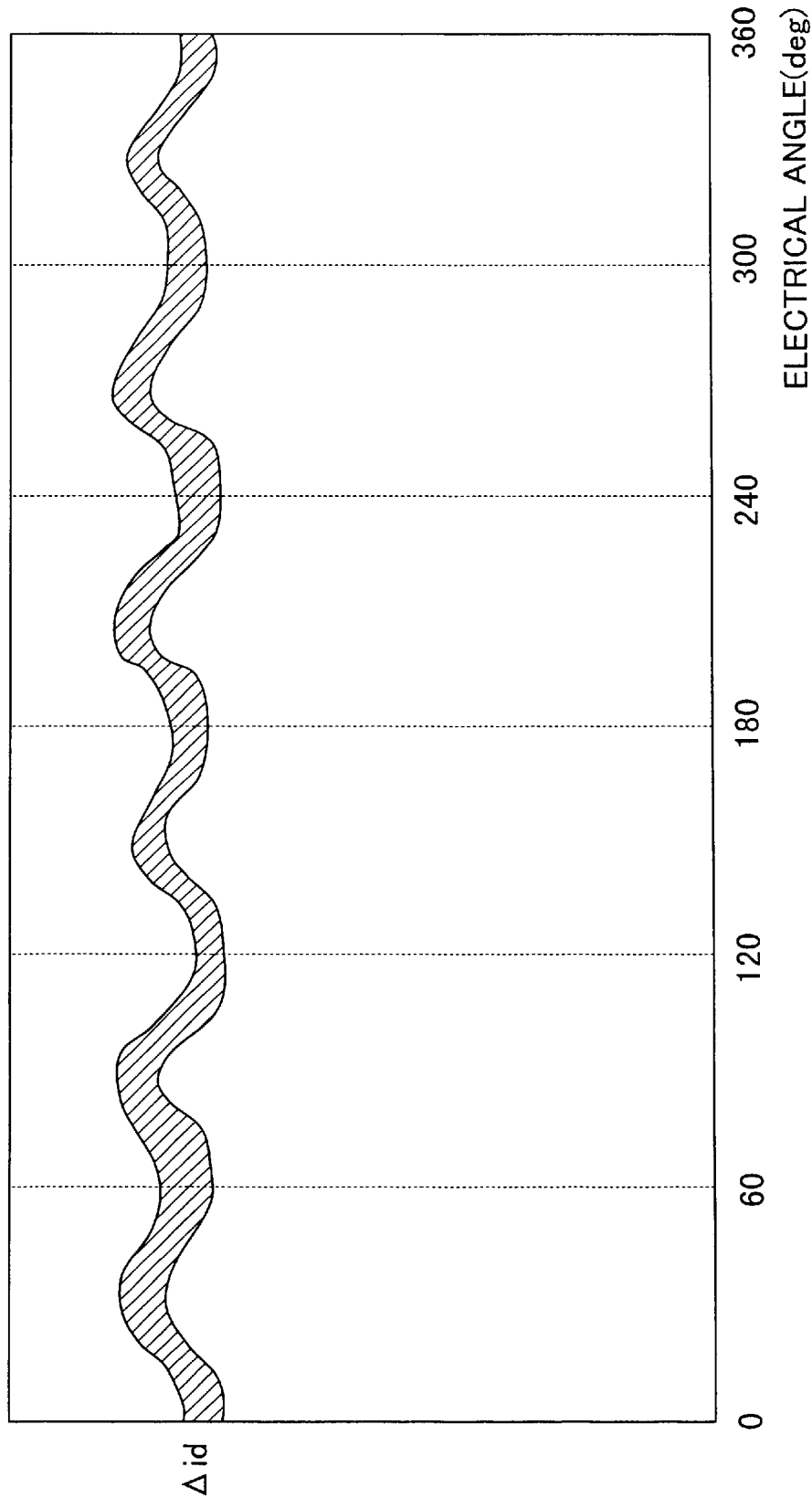
FIG. 12 is a graph showing the relationship between the variation in voltage on the axis 'd' and the electrical angle.

FIG. 12 is a graph showing the relationship between the variation in voltage on the axis 'd' and the electrical angle. The graph shows a variation of electric current, due to adjustment of the duty to ensure application of a fixed detection voltage in the direction of the axis 'd' under the condition that the true value of the source voltage is successively changed. The duty is adequately set if the observed source voltage does not include any error. The variation $\Delta id$ in d-axis current is observed in the hatched area with regard to any voltage. The d-axis current is theoretically constant over the whole range of the electrical angle. In the actual measurement, however, the saliency causes a variation of the d-axis current according to the electrical angle as shown in the graph.

Figure 13:
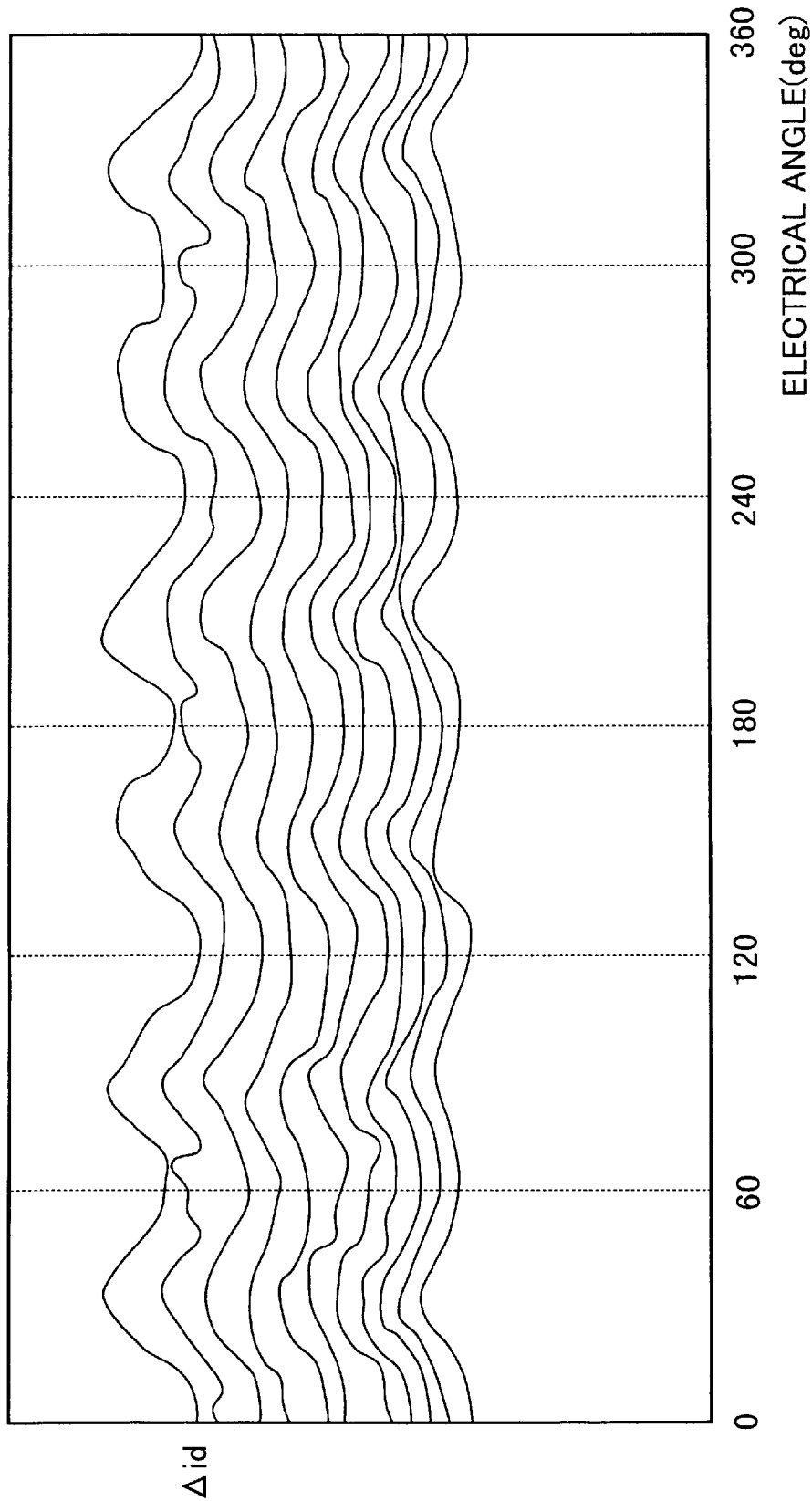
FIG. 13 is a graph showing variations in voltage on the axis 'd' when the source voltage includes an offset error.

FIG. 13 is a graph showing variations in voltage on the axis 'd' when the source voltage includes an offset error. The graph shows the result on the assumption that the observed value includes an offset error while the source voltage is kept constant. In the case where an offset error is included in the observed voltage, the duty is set by taking into account the offset error. This leads to a variation of the voltage applied to the coils. Namely the variation in d-axis current varies according to the offset error. Different from the graphs of FIGS. 8 to 10, the d-axis current has a relatively similar variation over the whole range of the electrical angle. The d-axis current is thus applicable for detection of the offset error over the whole range of the electrical angle.

The arrangement of applying the detection voltage to the axis 'd' does not require three different voltage correction tables corresponding to the U, V, and W phases, thus desirably reducing the required storage capacity of the table. This arrangement also omits the process of selecting the target phase to which the voltage is applied and the process of selectively referring to the table. This simplifies the whole series of processing and shortens the processing time. The above description regards the application of the detection voltage in the direction of the axis 'd', but the detection voltage may be applied in the direction of the axis 'q' or in any direction rotating with a rotation of the rotor. The direction of the axis 'd' has the smallest effect on the torque of the motor 40, and is thus preferably used to reduce a variation in torque of the motor 40 in the course of application of the detection voltage.

C. Second Embodiment

Figure 14:
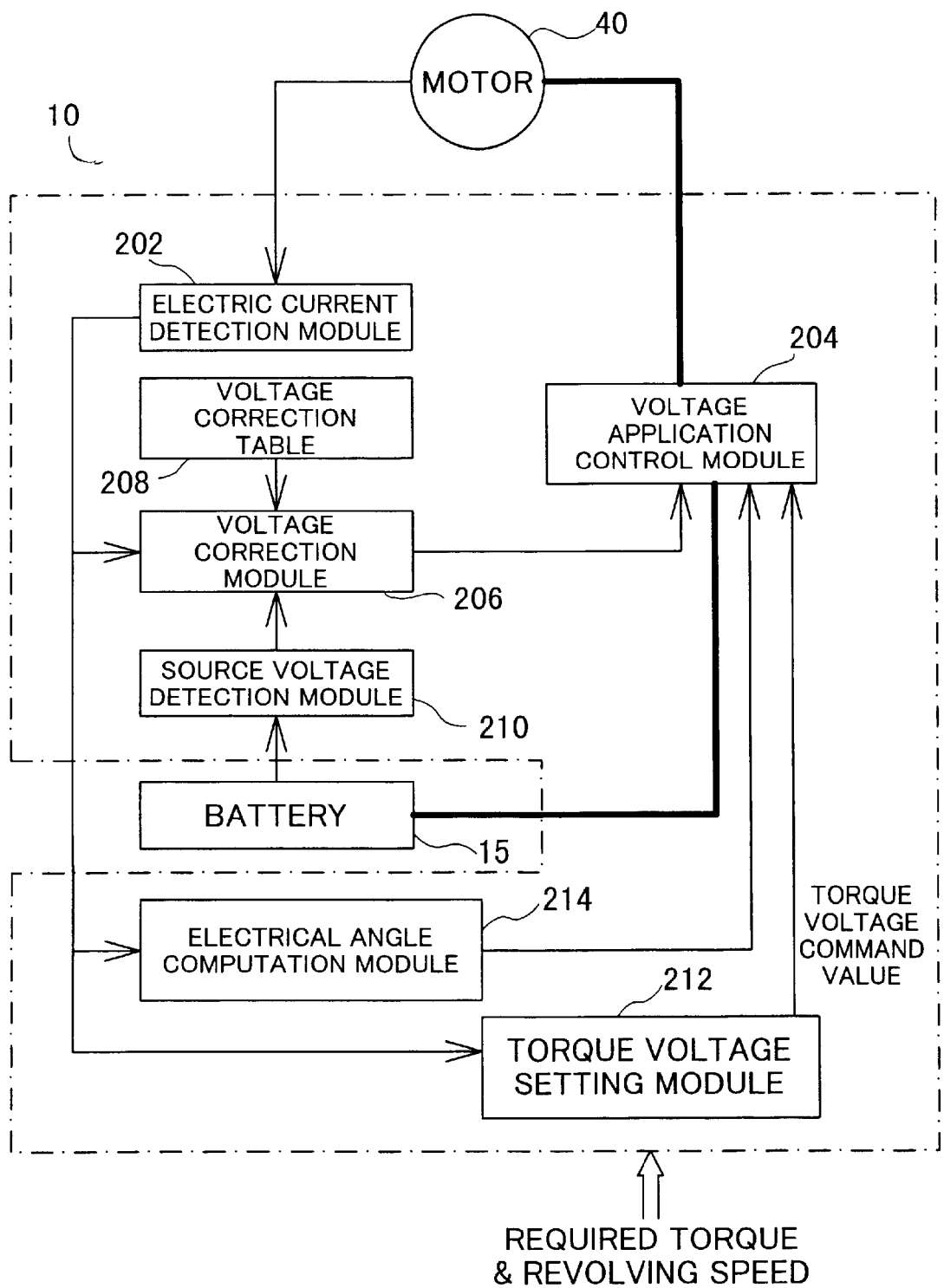
FIG. 14 shows functional blocks of the motor controller 10 in a second embodiment.

FIG. 14 shows functional blocks of the motor controller 10 in a second embodiment. The difference from the first embodiment is that the second embodiment has an electrical angle computation module 214, in place of the electrical angle detection module 200 (see FIG. 1). While the structure of the first embodiment uses a sensor to measure the electrical angle of the motor 40, the structure of the second embodiment detects the electrical angle in a sensor-less manner. The electrical angle computation module 214 requires the voltage application control module 204 to apply an electrical angle detection voltage for detection of the electrical angle and receives the values of electric currents, which run through the coils in response to the detection voltage and are measured by the electric current detection module 202. The electrical angle computation module 214 accordingly functions to obtain the electrical angle from the applied electrical angle detection voltage and the observed value of electric current.

The hardware structure of the second embodiment is similar to that of the first embodiment (see FIG. 2), except that the second embodiment does not include the electrical angle sensor 109. In the second embodiment, the control unit 100 corresponds to the electrical angle computation module 214.

The series of motor control process executed in the second embodiment is virtually equivalent to that of the first embodiment (see. FIG. 5). Namely the procedure carries out the voltage correction (step S100) and subsequently the electric current control corresponding to the normal operation of the motor 40 (steps S200 to S400). The details of the voltage correction are similar to those of the first embodiment (see FIG. 6), except that the procedure of the second embodiment detects the electrical angle (step S102) in a sensor-less manner.

The following describes the principle of detecting the electrical angle in a sensor-less manner in the second embodiment. A diversity of known techniques may be applied to detect the electrical angle in a sensor-less manner. The typical method applies a preset electrical angle detection voltage to the coils of the motor 40 and computes the electrical angle based on the behaviors of electric currents running through the coils in response to the applied voltage. The detection of the electrical angle in the voltage correction process is carried out without specifying the offset error included in the observed source voltage. This leads to application of the electrical angle detection voltage with rather poor accuracy. The procedure of the embodiment takes into account this drawback and detects the electrical angle by a specific method that is not affected by a potential error included in the electrical angle detection voltage.

Concretely the procedure of the embodiment adopts the technique disclosed in JAPANESE PATENT LAID-OPEN GAZETTE No.7-177788, which has been filed by the applicant of the present invention and laid open. More specifically the procedure of this embodiment adopts the method of the third embodiment selected among the diverse methods discussed in the cited reference. The outline of the method is discussed below. It is here assumed that the detection of the electrical angle is carried out while the motor 40 is at a stop.

Figure 15:
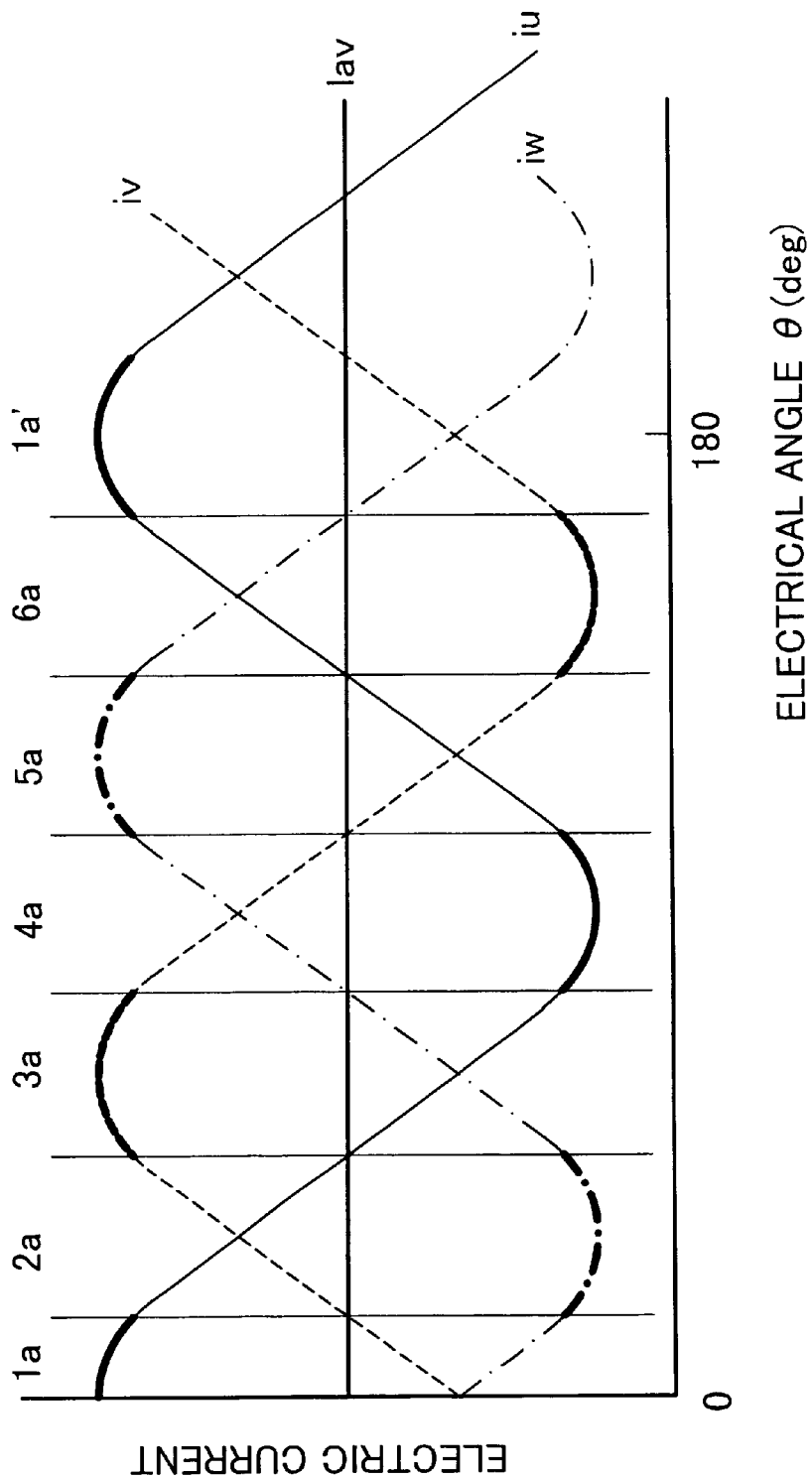
FIG. 15 is a graph showing variations of the electric currents running through the respective phases in the case of application of a preset detection voltage.

FIG. 15 is a graph showing variations of the electric currents running through the respective phases in the case of application of a preset detection voltage. In the salient-pole synchronous motor, the positional relationship between the permanent magnets attached to the rotor and the respective phase coils changes with a variation in electrical angle of the rotor 50. This leads to varying the inductances of the respective phase coils. The value of electric current running in response to the detection voltage is varied with a variation in inductance. FIG. 15 shows such variations of the electric currents. The curve of solid line denotes a variation in value of electric current iu of the U phase. The curve of broken line denotes a variation in value of electric current iv of the V phase. The curve of one-dot chain line denotes a variation in value of electric current iw of the W phase. A variation in mean value of the three-phase electric currents is expressed as iav.

As is known, the variation in U-phase electric current iu follows a cosine curve, and the value of electric current is expressed by an approximation of $\theta(\tan 2\theta)/2$ in the vicinity of the phase angle of 0 degree (the portions shown by the thick line). The electric currents of the respective phases are shifted by every 120 degrees. Expansion of the approximation in the respective phase currents gives expressions (7) below:

$$\theta(\tan 2\theta)/2$$

numerator of right side=$3(IB-IC)$ denominator of right side=$2\{2IA-(IB+IC)\}=6IA$ \hfill (7)

Here IA denotes a deviation of the interphase current having an extreme in the vicinity of the phase angle of 0 degree from the mean value iav. IB and IC respectively denote deviations of the other interphase currents from the mean value iav.

The deviations $\Delta iu$, $\Delta iv$, and $\Delta iw$ of the respective interphase currents of the U, V, and W phases from the mean value iav are divided into six divisions according to the electrical angle. Each division shows the following positive-negative relations. The deviation having a different sign corresponds to IA, and the other deviations correspond to IB and IC. The signs of the respective phases unequivocally identify the division, in which the electrical angle belongs to.

Division 1a (−15 to 15 degrees) $\Delta iu$: positive, $\Delta iv$: negative, $\Delta iw$: negative Division 2a (15 to 45 degrees) Δiu: positive, Δiv: positive, Δiw: negative Division 3a (45 to 75 degrees) Δiu: negative, Δiv: positive, Δiw: negative Division 4a (75 to 105 degrees) Δiu: negative, Δiv: positive, Δiw: positive Division 5a (105 to 135 degrees) Δiu: negative, Δiv: negative, Δiw: positive Division 6a (135 to 165 degrees) Δiu: positive, Δiv: negative, Δiw: positive With regard to each of the above divisions, the procedure substitutes the deviations Δiu, Δiv, and Δiw into IA, IB, and IC in the expressions (7) to obtain the electrical angle. The expressions (7) represent the approximation in the vicinity of the phase angle of 0 degree, so that the phase shift in each division should be considered for the detection of the electrical angle. Expressions (8) given below are used to detect the electrical angle in each division:

$$\text{Division 1a: } \sqrt{(3A/6\Delta iu)}$$

$$\text{Division 2a: } 30+\sqrt{(3B/6\Delta iw)}$$

$$\text{Division 3a: } 60+\sqrt{(3C/6\Delta iv)}$$

$$\text{Division 4a: } 90+\sqrt{(3A/6\Delta iu)}$$

$$\text{Division 5a: } 120+\sqrt{(3B/6\Delta iw)}$$

$$\text{Division 6a: } 180+\sqrt{(3C/6\Delta iv)} \qquad (8)$$

wherein

A=Δiv−Δiw

B=Δiu−Δiv

C=Δiw−Δiu

When the observed source voltage includes an offset error and the applied detection voltage is deviated from a required value, the observed value of electric current varies corresponding to the offset error. According to the expressions (8) given above, the electrical angle is calculated from the deviations of the respective interphase currents from the mean value iav. Namely the variations of the respective interphase currents, due to the offset error, do not affect the result of the computation. The technique of the second embodiment adopts this principle and ensures accurate detection of the electrical angle even when the offset error of the observed source voltage is not specified.

Figure 16:
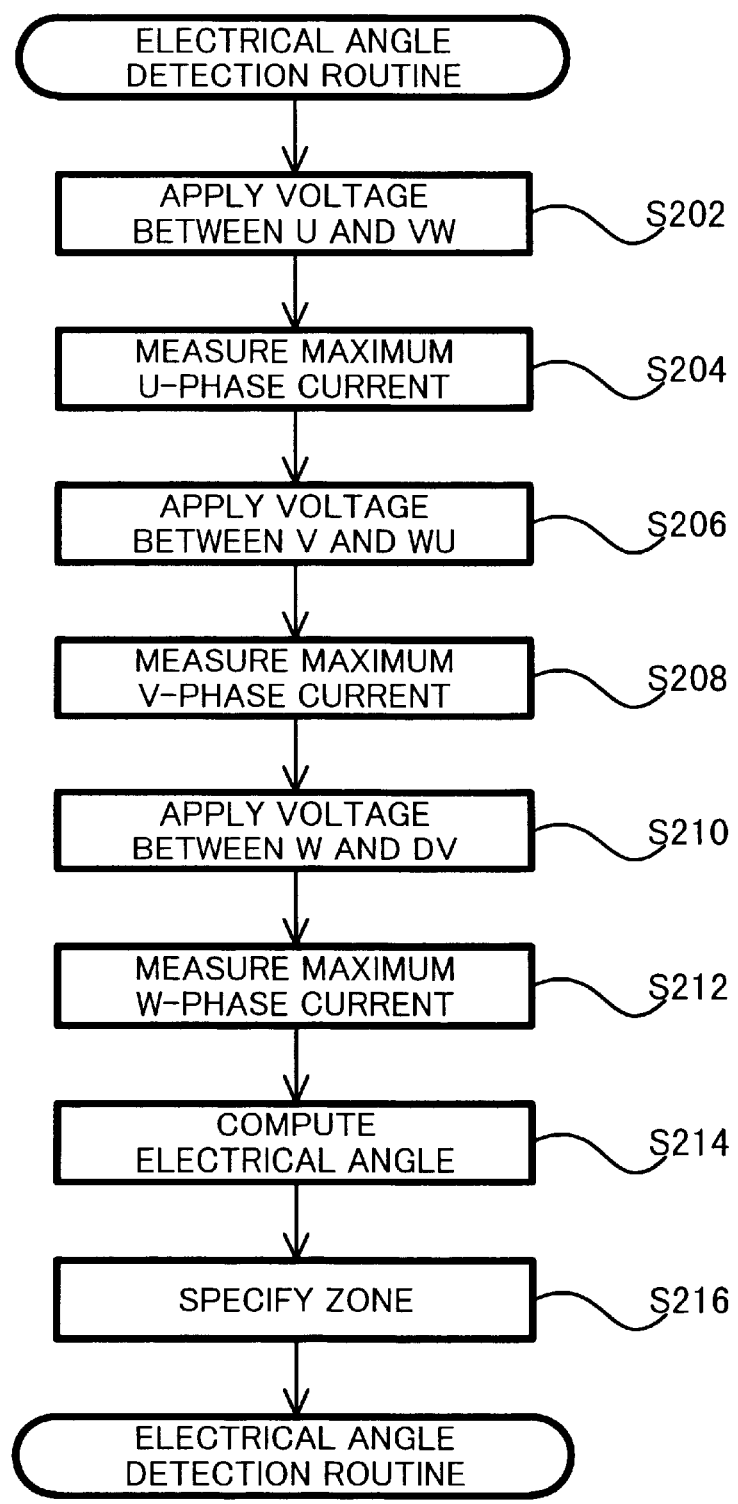
FIG. 16 is a flowchart showing an electrical angle detection routine.

The following describes a concrete procedure of detecting the electrical angle based on the above principle. FIG. 16 is a flowchart showing an electrical angle detection routine. When the program enters this routine, the CPU 120 first applies a preset detection voltage between the U and VW phases (step S202), and measures the maximum U-phase current (step S204). The value of electric current varies with elapse of time after the start of application of a voltage, and the maximum current represents the maximum value of the varying electric current. Here the value of electric current after elapse of a predetermined time period is measured as the maximum current.

In a similar manner, the CPU 120 applies the preset detection voltage between the V and WU phases (step S206) and measures the maximum V-phase current (step S208). The CPU 120 also applies the preset detection voltage between the W and UV phases (step S210) and measures the maximum W-phase current (step S212). The observed values of electric currents respectively correspond to iu, iv, and iw in the expressions (7) and (8) given above.

The CPU 120 subsequently computes the electrical angle (step S214). The concrete procedure selects the division, which the electrical angle belongs to, among the divisions 1a to 6a based on the above principle and calculates the electrical angle according to the corresponding one of the expressions (8). This operation specifies the electrical angle in the zone of 0 to 180 degrees.

The CPU 120 then specifies the zone (step S216). As clearly understood from FIG. 15, the variation in each phase current has a cycle of 180 degrees. The electrical angle computed at step S214 accordingly has two solutions in the zone of 0 to 180 degrees and in the zone of 180 to 360 degrees. At step S216, the CPU 120 accordingly determines whether the electrical angle belongs to the zone of 0 to 180 degrees or to the zone of 180 to 360 degrees. A diversity of methods may be applicable to determine the zone. The procedure of this embodiment adopts the method disclosed as an example of the second step in the third embodiment of JAPANESE PATENT LAID-OPEN GAZETTE No. 7-177788. The details of this method are not specifically described here. The determination of the zone can be performed accurately even when an offset error is included in the observed source voltage.

After the detection of the electrical angle according to the above series of processing, the procedure carries out the voltage correction in the same manner as the first embodiment (see FIG. 6) and subsequently performs the electric current control (see FIG. 5). The technique of the second embodiment carries out the sensor-less detection of the electrical angle (step S200 in FIG. 5) in the electric current control. At this moment, the motor 40 has already started the normal operation, so that the procedure utilizes the voltage equations of the equations (1) to (6) given previously for the detection of the electrical angle. The offset error specified by the voltage correction is naturally reflected on the voltage applied to the coils.

The motor controller of the second embodiment controls the operation of the motor 40 in a sensor-less manner. Especially the sensor-less voltage correction is of great significance. There are a variety of techniques proposed for the sensor-less detection of the electrical angle. Although the procedure of the second embodiment uses the equations (1) to (6) for the sensor-less detection of the electrical angle, other techniques may be adopted instead. In any case, it is required to apply a preset electrical angle detection voltage to the coils with high accuracy and measure the variations in electric currents in response to the applied voltage with high accuracy. In the case where the observed source voltage includes an offset error, it is impossible to apply the electrical angle detection voltage with high accuracy. This results in lowering the accuracy of detection of the electrical angle. Use of a sensor for detecting the electrical angle to specify the offset error included in the observed source voltage significantly damages the utility of the technique of controlling the operation of the motor 40 in a sensor-less manner.

The motor controller of the second embodiment attains the voltage correction in a sensor-less manner. This enables the electrical angle detection voltage to be applied with high accuracy during the normal operation and thus ensures accurate detection of the electrical angle. The motor controller of the second embodiment accordingly enables the motor 40 to be driven smoothly without causing any irregular variations of the torque and the revolving speed.

D. Application of Motor Controller

Figure 17:
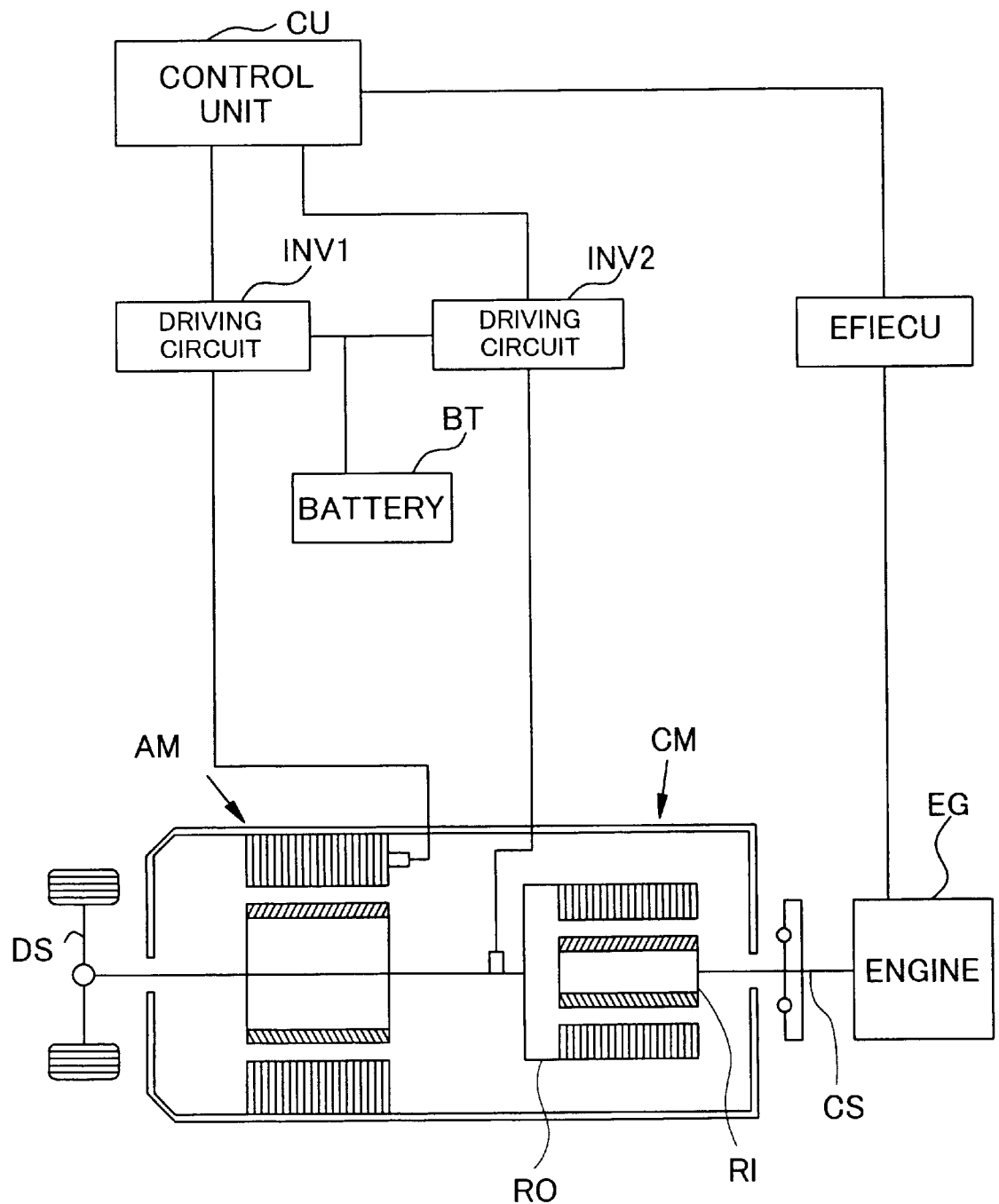
FIG. 17 schematically illustrates the structure of a hybrid car.

With a view to showing the availability of the motor controller of the embodiment, an application of the motor controller is discussed below with reference to FIG. 17. FIG. 17 schematically illustrates the structure of a hybrid car. The hybrid car is a vehicle with both an engine and a motor mounted thereon as power source. The hybrid car shown in FIG. 17 is constructed to allow direct transmission of engine power to driving wheels as described below. The hybrid car of such construction is called a parallel hybrid car.

The description first regards the schematic structure of the hybrid car shown in FIG. 17. The power system of the hybrid car includes an engine EG, a clutch motor CM, and an assist motor AM. The engine EG is a gasoline engine or a Diesel engine used for the conventional vehicles. The clutch motor CM is a pair-rotor motor having an inner rotor RI and an outer rotor RO that are rotatable relative to each other. A crankshaft CS of the engine EG is linked with the inner rotor RI of the clutch motor CM, whereas an axle DS is linked with the outer rotor RO.

The assist motor AM and the clutch motor CM are respectively driven by driving circuits INV1 and INV2, while inputting and outputting electric power from and to a battery BT. A control unit CU controls the operations of these constituents. The operation of the engine EG is controlled directly by an EFIECU, while the control unit CU outputs information required for the engine control to the EFIECU so as to indirectly control the operation of the engine EG. The control unit CU corresponds to the control unit 100 in FIG. 2. The driving circuits INV1 and INV2 correspond to the inverter 130, and the motors CM and AM to the motor 40. The diversity of sensors are omitted from the illustration of FIG. 17. Either of the motor controllers of the first embodiment and the second embodiment may be applied for this hybrid car.

In the hybrid car of the above construction, part of the power output from the engine EG is transmitted to the axle DS through electromagnetic coupling of the inner rotor RI with the outer rotor RO in the clutch motor CM. Regulation of the relative slip between the two rotors converts the revolving speed of the crankshaft CS into a revolving speed required for the axle DS. The clutch motor CM regenerates part of the power as electric power through the relative slip between the two rotors. The assist motor AM receives a supply of electric power and applies an additional torque to make the torque output to the axle DS coincident with the required torque. The electric power regenerated by the clutch motor CM is used for this supply. The hybrid car uses the clutch motor CM and the assist motor AM to convert the power output from the engine EG into a required combination of revolving speed and torque. The engine EG can thus be driven with a selected driving point of high driving efficiency. The hybrid car is driven in a diversity of other drive modes. For example, the hybrid car may be driven with only the power output from the motor AM, while the engine EG is at a stop.

In the hybrid car of the above construction, adequate control of the clutch motor CM and the assist motor AM is required to improve the ride of the vehicle and enhance the driving efficiency. Application of the motor controller discussed above to the hybrid car enables the clutch motor CM and the assist motor Am to be controlled with high accuracy, thus providing the hybrid car with good ride and a high driving efficiency. The motor controller discussed above is thus effectively applied to the hybrid car.

As described above, the motor controller of the present invention specifies an offset error included in the observed source voltage and corrects the source voltage, so as to ensure adequate operation of the motor. The above description regards the hybrid car as an example. The motor controller of the present invention is, however, not restricted to such applications, but is applicable to a variety of equipment utilizing a synchronous motor, such as railcars and industrial machinery. The above embodiments regard the synchronous motor as the object to be controlled. The technique of the present invention is also applicable to a diversity of AC motors and DC motors.

The control processes of the embodiments discussed above regulate the voltage applied to the motor by taking into account the error included in the observed source voltage. The error included in the observed voltage may, however, be reflected on the control in another application. For example, when the absolute value of the error is greater than a preset value, the procedure may determine the occurrence of some abnormality and carry out a predetermined process, for example, a process of calibrating the source voltage, a process of informing a driver of the occurrence of some abnormality, or an abnormal-time control process to restrict the output torque within a predetermined range.

The present invention is not restricted to the above embodiments or their modifications, but there may be many other modifications, changes, and alterations without departing from the cope or spirit of the main characteristics of the present invention. For example, part or all of the diverse processing discussed in the above embodiments may be actualized by the hardware structure. The procedure of the embodiment carries out the voltage correction (see FIG. 5) only at the time of a start-up of the motor 40. In one possible modification, the voltage correction may be carried out iteratively even after the motor 40 has started the normal operation. In the above embodiments, the offset error arises in the observed voltage. The technique of the present invention is also applicable to errors due to any other causes.

INDUSTRIAL APPLICABILITY

The technique of the present invention is used for a diversity of apparatuses with a motor to improve the precision of a voltage applied to the motor and thereby to enhance the accuracy of operation control of the motor.

What is claimed is:

1. A motor controller that regulates a voltage applied from a power source to a coil of a motor and thereby controls operation of said motor, said motor controller comprising:

a voltage estimation unit that estimates a voltage of said power source;

a detection voltage application unit that applies a preset detection voltage to said coil, based on the estimated voltage;

an electric current detection unit that measures a value of electric current running through said coil in response to the applied detection voltage;

an error specification unit that specifies an error included in the estimated voltage, based on the estimated voltage and the observed value of electric current; and an operation control unit that reflects the specified error on control of the operation of said motor.

2. A motor controller in accordance with claim 1, wherein said operation control unit comprises a voltage application control unit that applies a predetermined voltage according to a working state of said motor to said coil by taking into account the specified error.

3. A motor controller in accordance with claim 1, wherein said voltage estimation unit carries out the estimation, based on a measurement result of a voltage of said power source.

4. A motor controller in accordance with claim 1, wherein said error specification unit comprises:

a storage unit that stores a mapping of the voltage to the value of electric current; and an error computation unit that refers to the mapping to specify the error.

5. A motor controller in accordance with claim 4, wherein said storage unit stores the value of electric current mapped to each voltage in the form of a table.

6. A motor controller in accordance with claim 1, said motor rotating with a multi-phase alternating current, said motor controller further comprising an electrical angle detection unit that detects an electrical angle of a rotor included in said motor, wherein said detection voltage application unit applies the detection voltage to a specific phase set in advance for each electrical angle as a phase having a remarkable variation in value of electric current in response to the voltage.

7. A motor controller in accordance with claim 1, said motor rotating with a multi-phase alternating current, said motor controller further comprising an electrical angle detection unit that detects an electrical angle of a rotor included in said motor, wherein said detection voltage application unit applies the detection voltage in a predetermined direction, which rotates with a rotation of said rotor and is specified by the observed electrical angle.

8. A motor controller in accordance with claim 7, wherein said motor is a synchronous motor, and the predetermined direction passes through a rotation center of said rotor and is coincident with a magnetic flux of said rotor.

9. A motor controller in accordance with claim 1, said motor controller further comprising an error specification control unit that utilizes said voltage estimation unit, said detection voltage application unit, said electric current detection unit, and said error specification unit to specify the error, when said motor starts rotation.

10. A motor controller in accordance with claim 1, said motor controller further comprising an error convergence control unit that reflects the error specified by said error specification unit on the estimation carried out by said voltage estimation unit, and iteratively utilizes said voltage estimation unit, said detection voltage application unit, said electric current detection unit, and said error specification unit to make the error converge within a predetermined range.

11. A motor controller in accordance with claim 2, wherein said voltage application control unit comprises:

a torque voltage setting unit that sets a torque voltage to be applied to said coil in response to a required torque to be output from said motor; and a unit that applies the torque voltage by taking into account the error.

12. A motor controller in accordance with claim 1, said motor being a salient-pole synchronous motor, said motor controller further comprising an electrical angle computation unit that computes an electrical angle of said coil, based on a preset electrical angle detection voltage applied to said coil and an observed value of electric current running in response to the applied voltage, wherein said operation control unit applies the electrical angle detection voltage by taking into account the error.

13. A motor controller in accordance with claim 12, wherein said electrical angle computation unit computes the electrical angle by using a physical quantity, which is not affected by a potential error included in the electrical angle detection voltage, as a parameter, when said motor stops operation.

14. A method of controlling operation of a motor by regulating a voltage applied from a power source to a coil of said motor, said method comprising the steps of:

(a) estimating a voltage of said power source;

(b) applying a preset detection voltage to said coil, based on the estimated voltage;

(c) measuring a value of electric current running through said coil in response to the applied detection voltage;

(d) specifying an error of the estimated voltage, based on the estimated voltage and the observed value of electric current; and (e) controlling the operation of said motor by taking into account the specified error.

\* \* \* \* \*